United States Patent
Shimatani et al.

(10) Patent No.: US 9,010,943 B2
(45) Date of Patent: Apr. 21, 2015

(54) DISPLAY DEVICE

(75) Inventors: Takafumi Shimatani, Osaka (JP);
Kentarou Imamura, Osaka (JP);
Shigeto Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 200 days.

(21) Appl. No.: 13/807,370

(22) PCT Filed: Jun. 15, 2011

(86) PCT No.: PCT/JP2011/063667
§ 371 (c)(1),
(2), (4) Date: Dec. 28, 2012

(87) PCT Pub. No.: WO2012/002148
PCT Pub. Date: Jan. 5, 2012

(65) Prior Publication Data
US 2013/0100416 A1   Apr. 25, 2013

(30) Foreign Application Priority Data

Jun. 30, 2010   (JP) .................................. 2010-148580

(51) Int. Cl.
*G03B 21/28*   (2006.01)
*G02B 27/22*   (2006.01)
*H04N 13/04*   (2006.01)

(52) U.S. Cl.
CPC ............. *G03B 21/28* (2013.01); *G02B 27/2235* (2013.01); *H04N 13/0402* (2013.01); *H04N 13/0422* (2013.01); *H04N 13/0454* (2013.01)

(58) Field of Classification Search
CPC ........................... H04N 9/3164; H04N 9/3197
USPC ............ 353/10, 30, 32, 37, 74, 79, 99; 349/5, 349/7–9, 15; 455/25, 556.1; 348/333.01–333.02, 743–747
See application file for complete search history.

(56) References Cited

U.S. PATENT DOCUMENTS

| | | | |
|---|---|---|---|
| 6,163,363 A * | 12/2000 | Nelson et al. ................... 355/32 |
| 2001/0021002 A1 * | 9/2001 | Kodama et al. ................. 353/30 |
| 2002/0032043 A1 | 3/2002 | Ishikawa | |
| 2004/0212748 A1 * | 10/2004 | Suzuki et al. ..................... 349/8 |
| 2005/0122487 A1 * | 6/2005 | Koyama et al. ................. 353/94 |

(Continued)

FOREIGN PATENT DOCUMENTS

| | | |
|---|---|---|
| JP | 2002-077341 A | 3/2002 |
| JP | 2008-158114 A | 7/2008 |

(Continued)

OTHER PUBLICATIONS

International Search Report PCT/ISA/210.

*Primary Examiner* — Sultan Chowdhury
(74) *Attorney, Agent, or Firm* — Harness, Dickey & Pierce

(57) ABSTRACT

A display device includes: a display portion having a screen that can display an image; and an image forming substrate formed into a plate, wherein the image forming substrate are configured to be switchable between a first state where the screen is arranged to be inclined with respect to the first main surface such that light from the screen enters the image forming substrate from the first main surface side and forms the image on the second main surface side and a second state where the display portion and the image forming substrate are aligned in the thickness direction and are arranged along each other.

12 Claims, 20 Drawing Sheets

(56) References Cited

U.S. PATENT DOCUMENTS

| | | | |
|---|---|---|---|
| 2008/0068484 A1* | 3/2008 | Nam | 348/333.01 |
| 2008/0278641 A1 | 11/2008 | Uehara | |
| 2009/0310231 A1 | 12/2009 | Maekawa | |
| 2010/0195055 A1* | 8/2010 | Maekawa | 353/10 |
| 2010/0214394 A1 | 8/2010 | Maekawa | |
| 2010/0231860 A1 | 9/2010 | Maekawa | |

FOREIGN PATENT DOCUMENTS

| | | |
|---|---|---|
| JP | 2008-304885 A | 12/2008 |
| JP | 2009-75483 | 4/2009 |
| JP | 2009-223232 A | 10/2009 |
| JP | 2009-229905 A | 10/2009 |
| JP | 2009-276568 A | 11/2009 |
| WO | WO-2007/116639 A1 | 10/2007 |

* cited by examiner

DISPLAY DEVICE

TECHNICAL FIELD

The present invention relates to a display device, and particularly to a display device that can display an aerial image.

BACKGROUND ART

There have been conventionally proposed various types of display devices, optical systems and the like that can display an aerial image. For example, an optical system described in Japanese Patent Laying-Open No. 2008-158114 (PTL 1) has a reflective plane-symmetric imaging element that causes light from an object to be projected to form an image at a plane-symmetric position.

The reflective plane-symmetric imaging element is formed into a plate and the reflective plane-symmetric imaging element is provided with a plurality of holes. The hole is formed to have a rectangular shape when viewed from above the hole. A mirror surface is formed on each inner surface of the hole and the adjacent mirror surfaces are arranged to vertically intersect with each other.

The light from the object to be projected enters the hole from one opening of the hole. The light that has entered the hole is repeatedly reflected in the hole and is emitted outside from the other opening of the hole.

When the reflected light that is emitted from the other opening and the incident light that enters the hole are observed from above the reflective plane-symmetric imaging element, the reflected light travels in the direction exactly opposite to that of the incident light. When the incident light and the reflected light are observed from a side of the reflective plane-symmetric imaging element, an incidence angle of the incident light is equal to a reflection angle of the reflected light.

Therefore, the light from the object to be projected forms the image at the plane-symmetric position with respect to the reflective plane-symmetric imaging element serving as a reference plane.

An optical element described in International Publication No. WO2007/116639 (PTL 2) is formed into a plate and has a configuration similar to that of the reflective plane-symmetric imaging element described in aforementioned Japanese Patent Laying-Open No. 2008-158114 (PTL 1). Therefore, this optical element causes light that has been emitted from an object to be projected and entered the optical element from one side of an element surface to form an image at a plane-symmetric position with respect to the optical element serving as a reference plane. Consequently, a real image is displayed in a physically insubstantial space on the other side of the element surface.

Furthermore, International Publication No. WO2007/116639 (PTL 2) describes a three-dimensional aerial image display device including this optical element. This three-dimensional aerial image display device includes a substrate functioning as a reflective image forming element and a display portion arranged on the lower side of the substrate. Light that has been emitted from the display portion and entered the substrate from a lower surface of the substrate forms an image above an upper surface of the substrate.

A three-dimensional aerial image display device described in Japanese Patent Laying-Open No. 2009-229905 (PTL 3) includes a two-plane corner reflector array and a display having a display surface that displays an image. The two-plane corner reflector array forms a real image of an object to be projected at a plane-symmetric position with respect to a geometric plane serving as a symmetric plane. This three-dimensional aerial image display device includes a driving unit moving the two-plane corner reflector array in the vertical direction.

A volume scanning three-dimensional aerial image display described in Japanese Patent Laying-Open No. 2009-75483 (PTL 4) includes a two-plane corner reflector array, a display having a display surface that displays an image, and a driving unit moving the display in the direction vertical to the display surface.

CITATION LIST

Patent Literature

PTL 1: Japanese Patent Laying-Open No. 2008-158114
PTL 2: International Publication No. WO2007/116639
PTL 3: Japanese Patent Laying-Open No. 2009-229905
PTL 4: Japanese Patent Laying-Open No. 2009-75483

SUMMARY OF INVENTION

Technical Problem

The conventional optical systems and three-dimensional aerial image display devices are not configured to be switchable between a state where an aerial image is displayed and a state where an observer can directly observe a two-dimensional image displayed on the display portion.

Specifically, according to the aerial image display described in Japanese Patent Laying-Open No. 2009-75483, for example, when the observer directly looks at an image displayed on the display, the observer tries to view the image from the direction vertical to a screen of the display.

In this case, the observer views a mirror surface of the two-plane corner reflector array located on the display from the oblique direction. Therefore, a part of the image is covered with the mirror surface of the two-plane corner reflector array and the observer cannot observe the image successfully.

Furthermore, when the observer tries to look at the image from the direction vertical to an element surface of the plate-like two-plane corner reflector array, the sight line matches the height direction of the mirror surface. Therefore, the phenomenon in which the part of the image is covered with the mirror surface can be suppressed. On the other hand, the observer observes the image from the oblique direction, and thus, cannot view the image successfully.

The present invention has been made in light of the aforementioned problems and an object of the present invention is to provide a display device that can display an aerial image and also allows successful observation of a two-dimensional image by an observer.

Solution to Problem

A display device according to the present invention includes: a display portion having a screen that can display an image; and an image forming substrate formed into a plate. The image forming substrate includes a first main surface and a second main surface aligned in a thickness direction, and a plurality of mirror surface portions reflecting, toward the second main surface side, light that has been emitted from the display portion and has entered the image forming substrate from the first main surface side and forming the image on the second main surface side. The mirror surface portions extend in the thickness direction of the image forming substrate. The display portion and the image forming substrate are configured to be switchable between a first state where the screen is arranged to be inclined with respect to the first main surface such that light from the screen enters the image forming substrate from the first main surface side and forms the image on the second main surface side and a second state where the display portion and the image forming substrate are aligned in the thickness direction and are arranged along each other.

Preferably, the image forming substrate is provided with a plurality of holes extending in the thickness direction, and the mirror surface portion is formed on an inner circumferential surface of the hole. In the second state, the screen can be viewed through the holes.

Preferably, the display portion includes a black matrix having a light blocking effect. The black matrix includes a plurality of linear portions spaced apart from one another. The image forming substrate includes a plurality of first beam portions extending in a first direction along the first main surface and spaced apart from one another in a second direction intersecting with the first direction, and a plurality of second beam portions extending in the second direction and spaced apart from one another in the first direction. The image forming substrate is provided with the plurality of holes surrounded by the first beam portions and the second beam portions. The mirror surface portion is formed on the inner circumferential surface of the hole. When the display portion and the image forming substrate are viewed from above the image forming substrate in the second state, at least one of the first beam portions and the second beam portions are arranged to overlap with the linear portions and to extend along the linear portions.

Preferably, the display device further includes: a support member supporting at least one of the display portion and the image forming substrate to be rotatable about a first imaginary axis line such that an angle formed between the screen and the first main surface is variable; a control unit controlling a display position of the image; and a sensing unit sensing the angle formed between the screen and the first main surface. The control unit moves the image such that a distance from the first imaginary axis line increases as the angle formed between the screen and the first main surface decreases.

Preferably, assume that: a first reference screen represents the screen in the first state; a reference image represents an image displayed on the first reference screen; and a second imaginary axis line represents an imaginary axis line passing through the reference image and the image forming substrate. Furthermore, assume that: a second reference screen represents the screen when the display portion is moved from the first state such that the angle formed between the screen and the first main surface decreases; and an image display position represents an intersection point of the second reference screen and the second imaginary axis line. The control unit moves the image to the image display position.

Preferably, the control unit enhances a brightness of the screen as the angle formed between the screen and the first main surface decreases.

Preferably, assume that: a first reference screen represents the screen in the first state; a reference image represents an image displayed on the first reference screen; and a second imaginary axis line represents an imaginary axis line passing through the reference image and the image forming substrate. The control unit adjusts the brightness of the screen such that light traveling along the second imaginary axis line, of the light emitted from the screen, has a constant brightness.

Preferably, assume that: a first reference screen represents the screen in the first state; a reference image represents an image displayed on the first reference screen; and a second imaginary axis line represents an imaginary axis line passing through the reference image and vertical to the first reference screen. Assume that: a reference intersection point represents an intersection point of the image forming substrate and the second imaginary axis line; and a second reference screen represents the screen when the display portion is moved from the first state such that the angle formed between the screen and the first main surface decreases. Assume that a third imaginary axis line represents an imaginary axis line passing through the reference intersection point and vertically intersecting with the second reference screen. The control unit moves the image to an intersection point of the third imaginary axis line and the second reference screen.

Preferably, assume that an incidence angle represents an angle when the light from the display portion enters the first main surface. An image forming component ratio of the image forming substrate decreases as the incidence angle becomes smaller than a predetermined incidence angle. When the angle formed between the screen and the first main surface becomes smaller than the predetermined incidence angle, the control unit enhances a brightness of the image.

Preferably, the image forming substrate is provided to be retractable from above the display portion.

Preferably, the display portion includes a first display portion and a second display portion. At least one of the first display portion and the second display portion is configured to be switchable between the second state and the first state. Preferably, the display portion is located on the second main surface of the image forming substrate in the second state.

Advantageous Effects of Invention

In the display device according to the present invention, an aerial image can be displayed and the observer can successfully observe a two-dimensional image as well.

DESCRIPTION OF EMBODIMENTS

A display device according to the present invention will be described with reference to FIGS. 1 to 36.

First Embodiment

Figure 1:
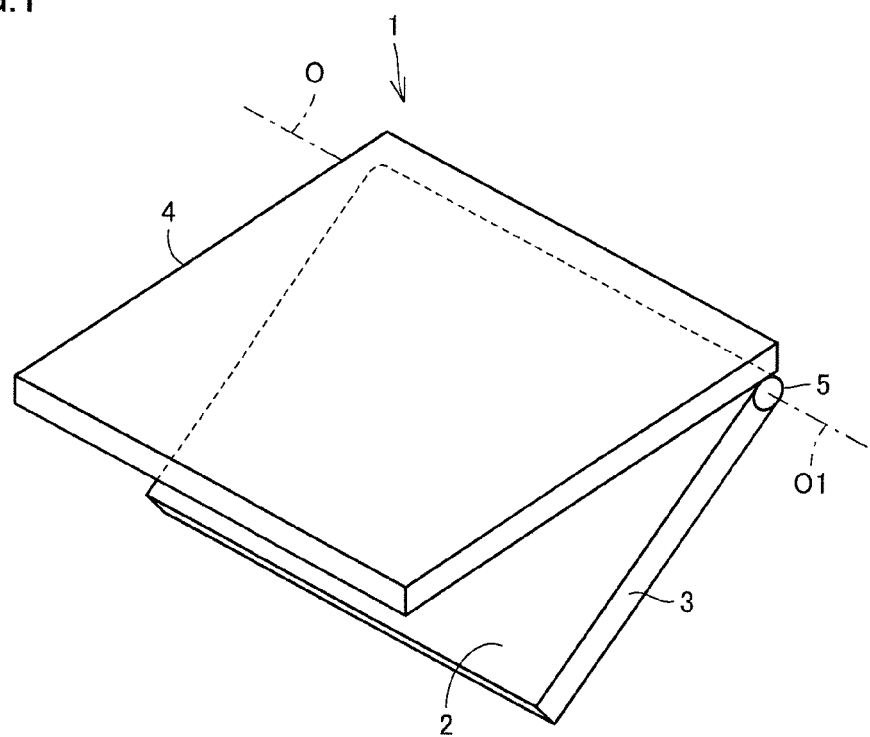
FIG. 1 is a perspective view showing a schematic configuration of a display device 1 according to a first embodiment.
Figure 2:
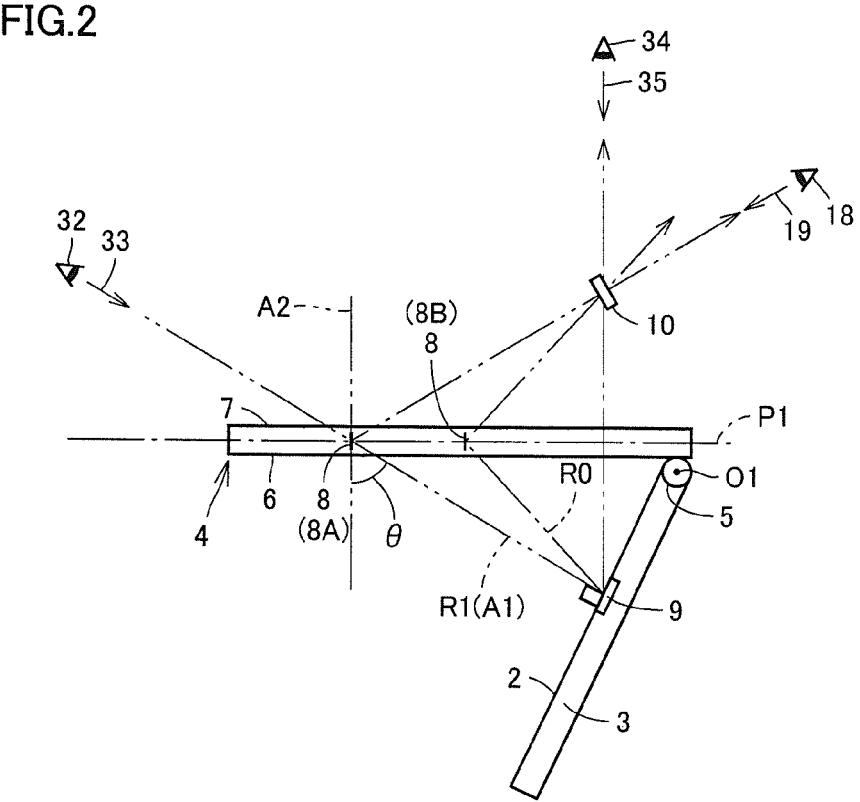
FIG. 2 is a side view showing the schematic configuration of display device 1.

FIG. 1 is a perspective view showing a schematic configuration of a display device 1 according to a first embodiment. FIG. 2 is a side view showing the schematic configuration of display device 1.

As shown in FIG. 1, display device 1 includes a display portion 3 having a screen 2 that can display an image, an image forming substrate 4 and a hinge portion 5. Image forming substrate 4 and display portion 3 are supported by hinge portion 5 such that at least one is rotatable about a rotation center line (imaginary axis line) O1 with respect to the other. In the present embodiment, hinge portion 5 is provided at one side of the outer perimeter of display portion 3 and display portion 3 is supported by hinge portion 5 to be rotatable about rotation center line O1.

In the state shown in FIG. 1, screen 2 of display portion 3 is arranged to be inclined with respect to image forming substrate 4.

In FIG. 2, image forming substrate 4 is formed into a flat plate and includes a main surface 6 and a main surface 7 aligned in the thickness direction of image forming substrate 4, and a plurality of mirror surface portions 8. Image forming substrate 4 is provided with a plurality of holes extending from main surface 6 to main surface 7 in the thickness direction of image forming substrate 4, and mirror surface portion 8 is formed on an inner circumferential surface of this hole. Mirror surface portions 8 extend in the thickness direction of image forming substrate 4 and the height direction of mirror surface portions 8 matches the thickness direction of image forming substrate 4. The holes and mirror surface portions 8 are uniformly distributed over image forming substrate 4.

Main surface 6 is provided to face screen 2 of display portion 3, and light from an image 9 displayed on screen 2 enters image forming substrate 4 from openings of the aforementioned holes.

Now, assume that an imaginary axis line A1 represents an imaginary axis line passing through image 9 and vertical to screen 2, and an imaginary axis line A2 represents an imaginary axis line extending in the thickness direction of image forming substrate 4. Furthermore, assume that an intersection angle θ represents a smaller intersection angle, of the intersection angles formed between imaginary axis line A1 and imaginary axis line A2. Intersection angle θ changes when display portion 3 is rotated about rotation center line O1, and corresponds to an opening angle formed between image forming substrate 4 and display portion 3.

In this state shown in FIGS. 1 and 2, the light from image 9 enters image forming substrate 4 from main surface 6 and is reflected toward the main surface 7 side by mirror surface portions 8. The reflected light forms an image at a position above main surface 7 and an aerial image 10 is thus displayed.

Now, assuming that an imaginary plane P1 represents an imaginary plane passing through a central portion in the thickness direction of image forming substrate 4 and vertically intersecting with mirror surface portions 8, aerial image 10 is formed at a position that is symmetric to image 9 with respect to imaginary plane P1 serving as a reference plane.

For example, as shown in FIG. 2, of the light from image 9, light R1 traveling in the direction vertical to screen 2 is reflected by a mirror surface portion 8A and arbitrary light R0 emitted from image 9 is reflected by a mirror surface portion 8B. The reflected light of light R1 and the reflected light of light R0 intersect with each other at the portion where aerial image 10 is located, and it can be seen that an image is formed at this focal position.

In the example shown in this FIG. 2, aerial image 10 is located above main surface 7. A distance between aerial image 10 and imaginary plane P1 is equal to a distance between image 9 and imaginary plane P1. By rotating display portion 3 such that intersection angle θ increases, the opening angle formed between image forming substrate 4 and display portion 3 is increased. Then, the distance between image 9 and imaginary plane P1 is increased and aerial image 10 can be floated higher. As described above, by adjusting intersection angle θ, the floating height of displayed aerial image 10 can be adjusted.

Figure 3:
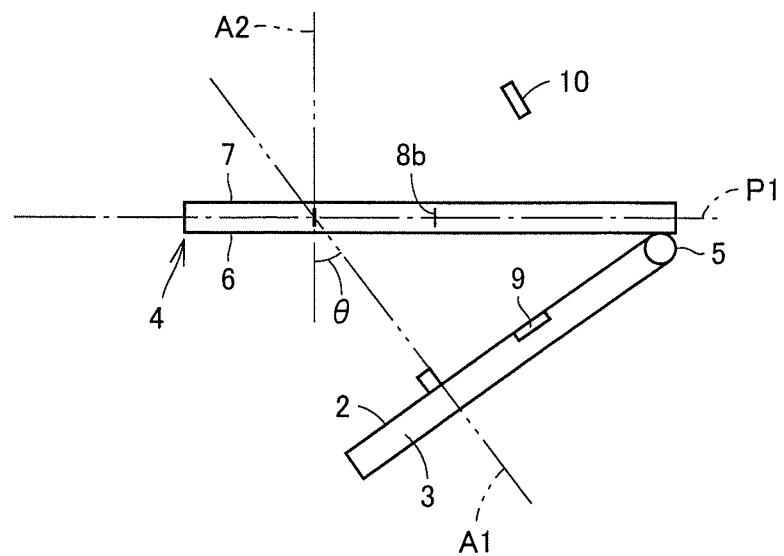
FIG. 3 is a side view showing a state where a display portion 3 has been rotated from the state shown in FIG. 2 such that an intersection angle θ decreases.

FIG. 3 is a side view showing a state where display portion 3 has been rotated from the state shown in FIG. 2 such that intersection angle θ decreases. As shown in this FIG. 3, when intersection angle θ decreases, the distance between image 9 and imaginary plane P1 becomes shorter and the floating height of aerial image 10 becomes lower as well.

Figure 4:
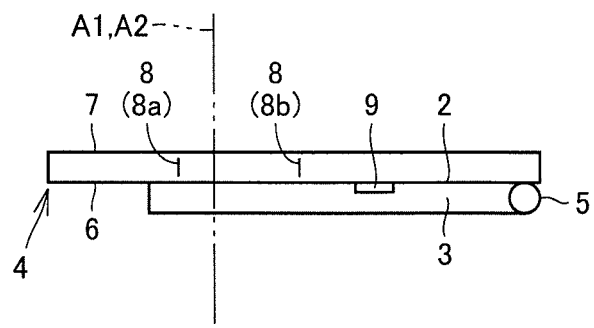
FIG. 4 is a side view showing a state where display portion 3 has been rotated from the state shown in FIG. 3.

FIG. 4 shows a state where display portion 3 has been rotated such that intersection angle θ further decreases and intersection angle θ has reached 0°. In the state shown in this FIG. 4, display portion 3 is located on the lower surface side of main surface 6 of image forming substrate 4, and display portion 3 and image forming substrate 4 are aligned in the thickness direction of image forming substrate 4 and are arranged along each other. Screen 2 of display portion 3 and main surface 6 of image forming substrate 4 are arranged along each other, and the height direction of mirror surface portion 8A and mirror surface portion 8B is parallel to imaginary axis line A1 vertical to screen 2. When the observer views image 9 two-dimensionally from above image forming substrate 4 in the state where intersection angle θ is 0° as shown in this FIG. 4, a sight line of the observer is parallel to the height direction of mirror surface portions 8.

Therefore, when the observer views image 9 two-dimensionally from above image forming substrate 4 in the state where intersection angle θ is 0°, a phenomenon in which image 9 is covered with mirror surface portions 8 can be suppressed and the observer can observe image 9 successfully.

Figure 5:
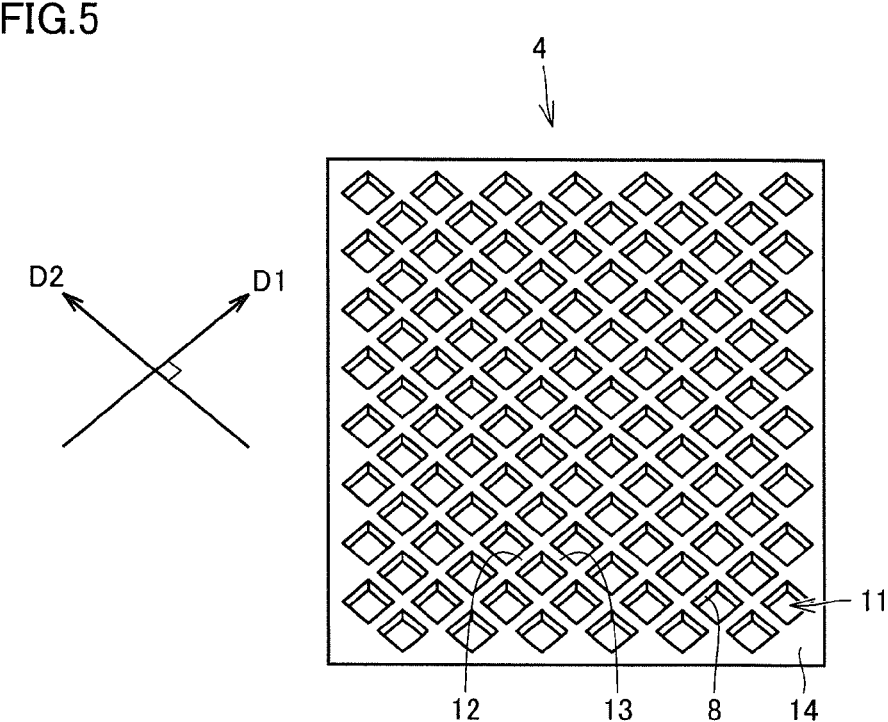
FIG. 5 is a perspective view showing an image forming substrate 4.

FIG. 5 is a perspective view showing image forming substrate 4. As shown in this FIG. 5, image forming substrate 4 is provided with a plurality of holes 11. Holes 11 are arranged in an array. Image forming substrate 4 includes a beam portion 12 extending in a first direction D1, a beam portion 13 extending in a second direction D2, and a frame portion 14 arranged at an outer perimeter edge of image forming substrate 4. A plurality of beam portions 12 are spaced apart from one another in second direction D2, and a plurality of beam portions 13 are also spaced apart from one another in first direction D1. Opposing ends of beam portions 12 and 13 are connected to frame portion 14. It is to be noted that first direction D1 is a direction extending along the main surface of image forming substrate 4, and second direction D2 is a direction extending along the main surface of image forming substrate 4 and orthogonal to first direction D1.

Two adjacent beam portions 12 and two adjacent beam portions 13 constitute each hole 11. Hole 11 passes through image forming substrate 4 and extends in the thickness direction of image forming substrate 4. Mirror surface portion 8 is formed on the inner circumferential surface of hole 11.

Figure 6:
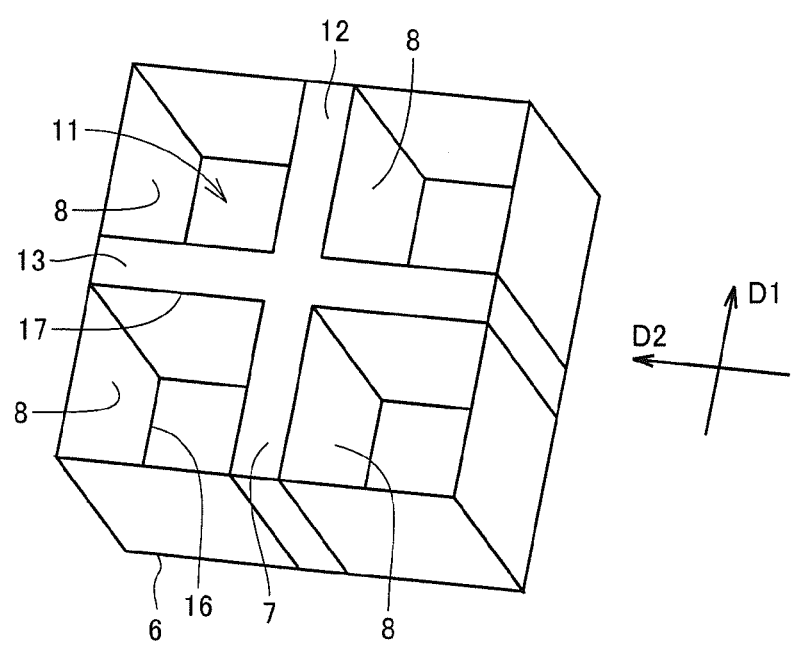
FIG. 6 is a perspective view showing a part of image forming substrate 4.
Figure 7:
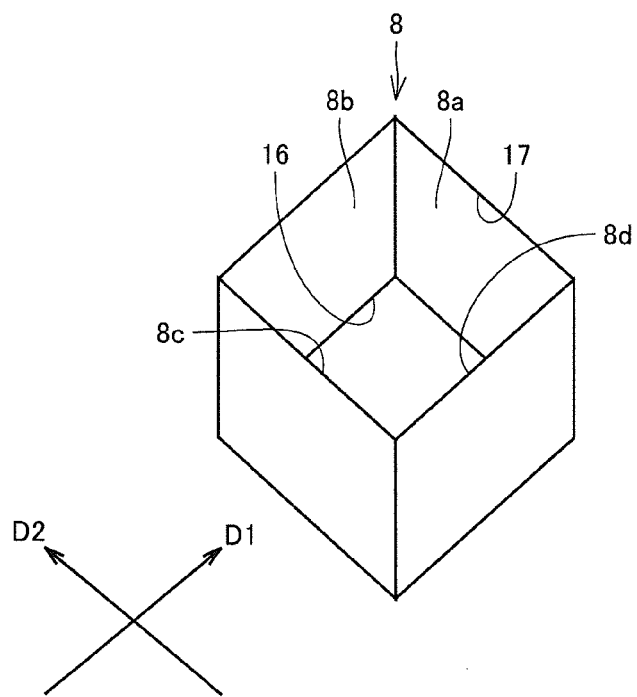
FIG. 7 is a perspective view showing one mirror surface portion 8.

FIG. 6 is a perspective view showing a part of image forming substrate 4. As shown in this FIG. 6, beam portion 12 or beam portion 13 is located between adjacent mirror surface portions 8. Main surface 6 of image forming substrate 4 is provided with an opening 16 of hole 11 and main surface 7 is provided with an opening 17. FIG. 7 is a perspective view showing one mirror surface portion 8. As shown in this FIG. 7, mirror surface portion 8 includes four reflective surfaces 8a to 8d. Reflective surface 8a and reflective surface 8c are spaced apart from each other and arranged to face each other. Reflective surface 8b and reflective surface 8d are spaced apart from each other and arranged to face each other. Reflective surface 8b is arranged to connect one side of reflective surface 8a and one side of reflective surface 8c, and reflective surface 8d is arranged to connect the other side of reflective surface 8a and the other side of reflective surface 8c. Reflective surface 8a vertically intersects with reflective surface 8b and reflective surface 8d, and reflective surface 8c also vertically intersects with reflective surface 8b and reflective surface 8d. Reflective surfaces 8a and 8c extend in second direction D2 and reflective surfaces 8b and 8d extend in first direction D1.

Reflective surfaces 8a to 8d are formed to extend from opening 17 to opening 16, and reflective surfaces 8a to 8d extend in the thickness direction of image forming substrate 4.

For example, about several tens of thousands to hundreds of thousands of mirror surface portions 8 are, for example, formed in 5 cm×5 cm of image forming substrate 4.

One side of each of reflective surfaces 8a to 8d located at the opening edge of hole 11 has a length of, for example, 50 to 1000 μm, and preferably 150 μM. Furthermore, each of reflective surfaces 8a to 8d has a height of, for example, 50 to 1000 μm, and preferably 150 μm.

Figure 8:
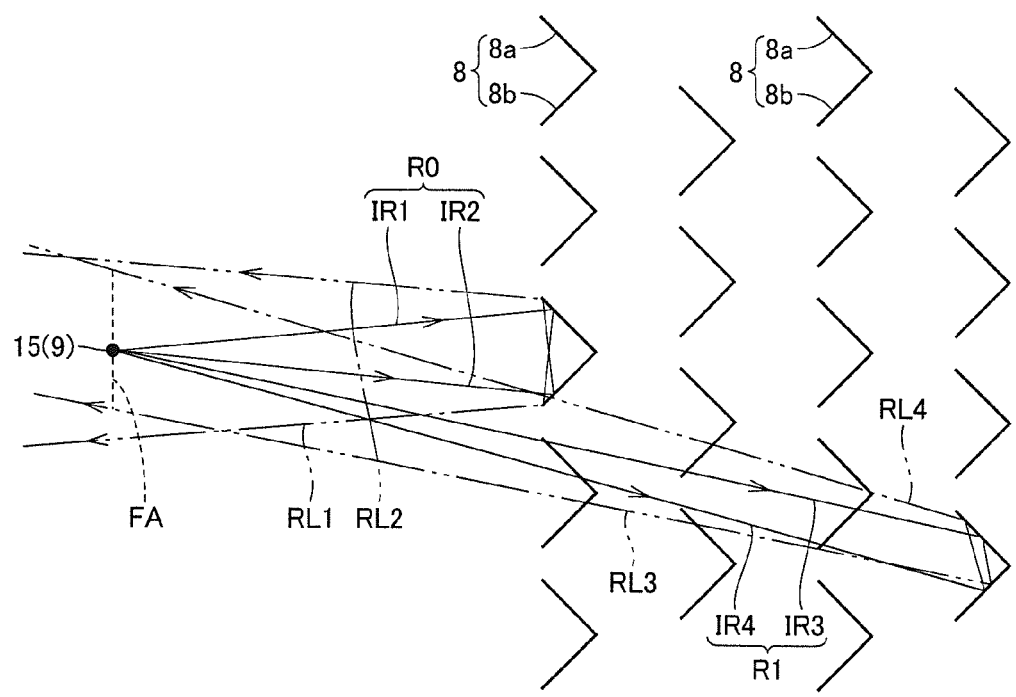
FIG. 8 is a side view describing a route followed by light from an image 9 before the light forms an image.

A route followed by the light from image 9 before the light forms an image will be described with reference to FIGS. 2 and 8. Attention is focused on light R0 in an arbitrary direction with respect to image 9 and light R1 in the direction vertical to image 9, of the light from one light source (pixel) 15 constituting image 9. Light R0 includes incident lights IR1 and IR2, and light R1 includes incident lights IR3 and IR4.

Incident light IR1 enters hole 11 from opening 16 shown in FIG. 6 and is reflected by reflective surface 8a. This reflected light is again reflected by reflective surface 8b. Reflected light RL1 reflected by reflective surface 8b is emitted outside from opening 17 shown in FIG. 6. Incident light IR2 is reflected by reflective surface 8b and this reflected light is again reflected by reflective surface 8a. Then, the reflected light is emitted outside as reflected light RL2.

When reflected light RL1 and incident light IR1 are viewed two-dimensionally from above image forming substrate 4, reflected light RL1 is parallel to incident light IR1, and the direction in which reflected light RL1 travels is exactly opposite to the direction in which incident light IR1 travels. Similarly, reflected light RL2 is parallel to incident light IR2, and the direction in which reflected light RL2 travels is exactly opposite to the direction in which incident light IR2 travels.

As shown in FIG. 2, mirror surface portion 8 reflects light R0 without changing a vertical component of light R0. Therefore, as shown in FIG. 8, when image forming substrate 4 is viewed two-dimensionally, a part of the reflected light of light R0 passes through a focus area FA located above light source 15.

Similarly, mirror surface portion 8 reflects incident light IR3 of light R1 as reflected light RL3 and reflects incident light IR4 as reflected light RL4. Reflected light RL3 is parallel to incident light IR3, and the direction in which reflected light RL3 travels is exactly opposite to the direction in which incident light IR3 travels. Similarly, reflected light RL4 is also parallel to incident light IR4, and the direction in which reflected light RL4 travels is exactly opposite to the direction in which incident light IR4 travels. Therefore, the reflected light of light R1 also passes through focus area FA.

As described above, the light that has been emitted from light source 15 and entered image forming substrate 4 is retroreflected by image forming substrate 4 and forms an image in focus area FA. Consequently, as shown in FIG. 2, aerial image 10 is formed at a predetermined position.

A size of focus area FA depends on a size of mirror surface portion 8, and the size of focus area FA can be reduced by making mirror surface portion 8 more minute. On the other hand, as the size of mirror surface portion 8 decreases, an aperture ratio (area ratio that allows passage of light) decreases and the brightness of the aerial image decreases. In addition, light diffraction occurs and the resolution of the aerial image decreases. Therefore, the size of mirror surface portion 8 is appropriately set in accordance with a light focusing distance.

Figure 9:
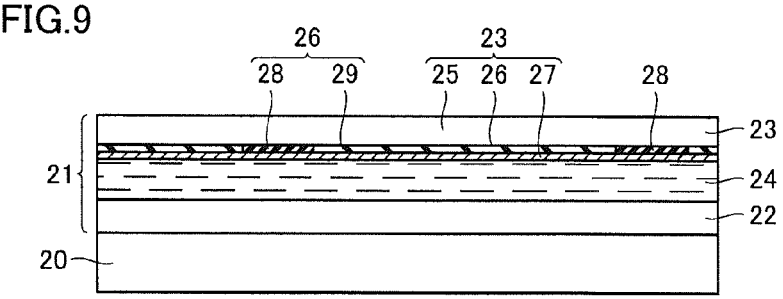
FIG. 9 is a cross-sectional view schematically showing display portion 3.

FIG. 9 is a cross-sectional view schematically showing display portion 3. Display portion 3 includes a backlight unit 20 and a display unit 21 arranged on an upper surface of this backlight unit 20. Backlight unit 20 emits light toward display unit 21.

Display unit 21 includes an active matrix substrate 22 arranged on the upper surface of backlight unit 20, a common substrate 23 spaced apart from active matrix substrate 22 and arranged to face active matrix substrate 22, and a liquid crystal layer 24 filled between common substrate 23 and active matrix substrate 22.

A polarizing plate (not shown) is arranged between active matrix substrate 22 and backlight unit 20, and a polarizing plate (not shown) is arranged on an upper surface of common substrate 23 as well. A vibration direction of light that passes through one polarizing plate is orthogonal to a vibration direction of light that passes through the other polarizing plate.

Common substrate 23 includes a glass substrate 25, a color filter 26 formed on a lower surface of this glass substrate 25, and a common electrode 27 arranged on a lower surface of color filter 26. Color filter 26 includes a black matrix 28 and a color layer 29. Black matrix 28 is formed into a grid and black matrix 28 is provided with a plurality of window portions. Color layer 29 is formed in this window portion.

Active matrix substrate 22 includes a plurality of TFT transistors (not shown), a gate line connected to a gate electrode of the TFT transistor, a source line connected to a source electrode of the TFT transistor, and a pixel electrode connected to a drain electrode of the TFT transistor. The gate line and the source line are arranged below black matrix 28 formed into a grid.

By switching ON/OFF of the TFT transistor, a voltage is applied or is not applied to the pixel electrode. In accordance with a voltage between the common electrode and the pixel electrode, the alignment direction of liquid crystals in the liquid crystal layer located between the pixel electrode and the common electrode is switched.

When light from backlight unit 20 passes through the not-shown polarizing plate, the vibration direction of the light is oriented to the same direction. Thereafter, the vibration direction of the light changes in accordance with the alignment state of the liquid crystals. Consequently, the light that has passed through liquid crystal layer 24 can pass through the polarizing plate located on common substrate 23 or is blocked by the polarizing plate.

When the light from backlight unit 20 passes through the polarizing plate arranged on the upper surface of common substrate 23, the light from the backlight has already passed through color layer 29. Therefore, the colored light corresponding to a color of color layer 29 is emitted outside.

Although color filter 26 is provided on the common substrate 23 side in the example shown in this FIG. 9, color filter 26 may be provided on active matrix substrate 22.

Figure 10:
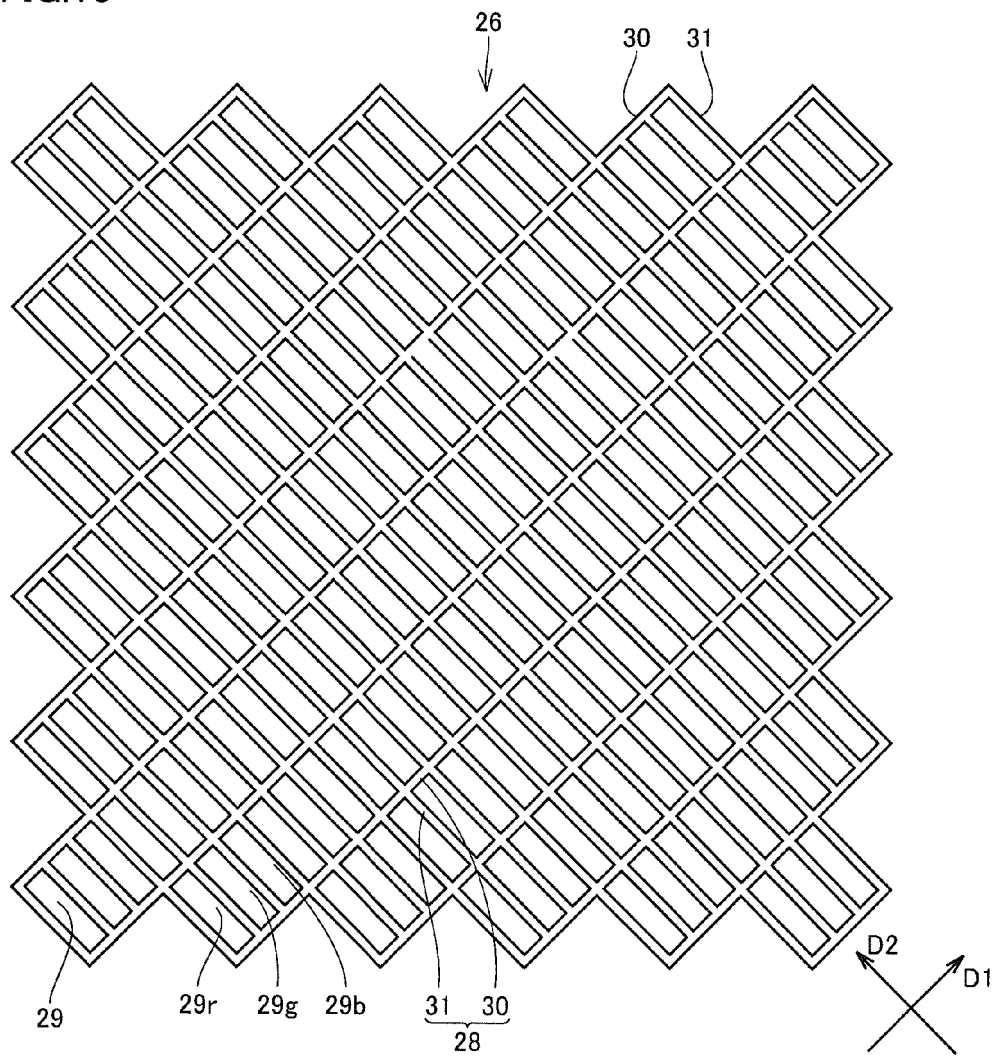
FIG. 10 is a plan view schematically showing a part of a color filter 26.

FIG. 10 is a plan view schematically showing a part of color filter 26. As shown in this FIG. 10, color filter 26 includes black matrix 28 and color layer 29. Black matrix 28 includes a plurality of beam portions 30 extending in first direction D1 and spaced apart from one another in second direction D2, and a plurality of beam portions 31 extending in second direction D2 and spaced apart from one another in first direction D1.

Two adjacent beam portions 30 and two adjacent beam portions 31 constitute the window portion. Each window portion is provided with color layer 29. Color layer 29 includes a red color layer 29r, a green color layer 29g and a blue color layer 29b. It is to be noted that this FIG. 10 is a schematic view, and widths of beam portions 30 and 31, a size of color layer 29 and the like are not shown accurately.

Figure 11:
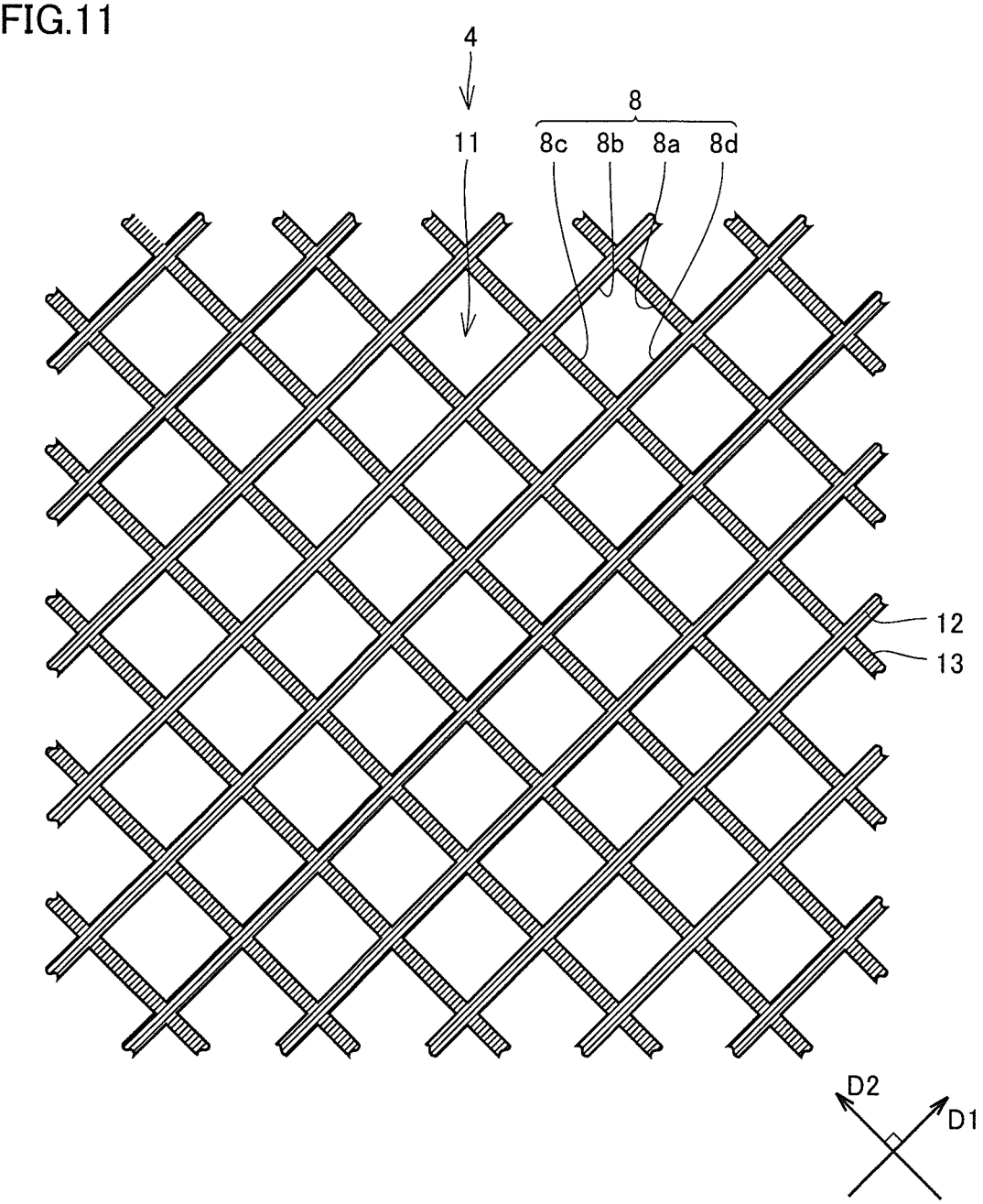
FIG. 11 is a plan view schematically showing a part of image forming substrate 4.

FIG. 11 is a plan view schematically showing a part of image forming substrate 4. As shown in this FIG. 11, image forming substrate 4 includes a plurality of beam portions 12 extending in first direction D1 and spaced apart from one another in second direction D2, and a plurality of beam portions 13 extending in second direction D2 and spaced apart from one another in first direction D1. Two adjacent beam portions 12 and two adjacent beam portions 13 constitute hole 11.

Figure 12:
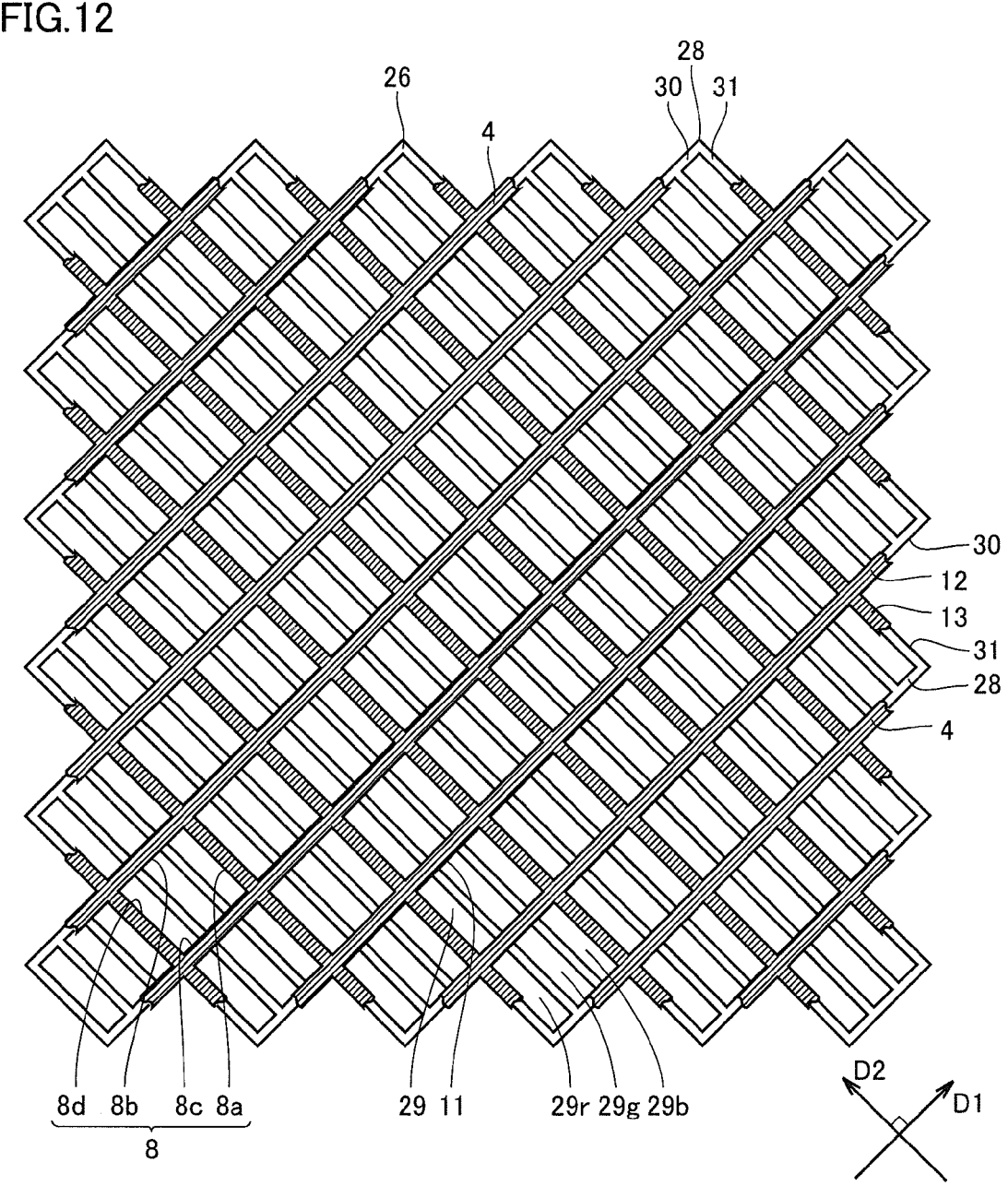
FIG. 12 is a plan view when image forming substrate 4 and display portion 3 are viewed two-dimensionally from above image forming substrate 4, with display portion 3 and image forming substrate 4 laminated as shown in FIG. 4 above.

FIG. 12 is a plan view when image forming substrate 4 and display portion 3 are viewed two-dimensionally from above image forming substrate 4, with display portion 3 and image forming substrate 4 laminated as shown in FIG. 4 above.

In this FIG. 12 and FIG. 4, beam portion 30 of black matrix 28 is located below beam portion 12 of image forming substrate 4, and beam portion 31 of black matrix 28 is located below beam portion 13 of image forming substrate 4. Beam portion 30 extends along beam portion 12 and beam portion 31 extends along beam portion 13. Color layer 29 is located within hole 11.

In such a manner, it is suppressed that beam portions 12 and 13 of image forming substrate 4 are located on color layer 29. Both beam portion 12 and beam portion 13 of image forming substrate 4 do not need to be located above beam portion 30 or beam portion 31 of black matrix 28. One of beam portion 12 and beam portion 13 of image forming substrate 4 may be located above beam portion 30 or beam portion 31 of black matrix 28 and extend along beam portion 30 or beam portion 31.

Beam portion 12 and beam portion 13 of image forming substrate 4 has a width of, for example, 10 μm and beam portion 30 and beam portion 31 of black matrix 28 also has a width of, for example, approximately 10 μm. Preferably, the width of beam portions 12 and 13 of image forming substrate 4 is set to be smaller than that of beam portions 30 and 31 of black matrix 28.

Figure 13:
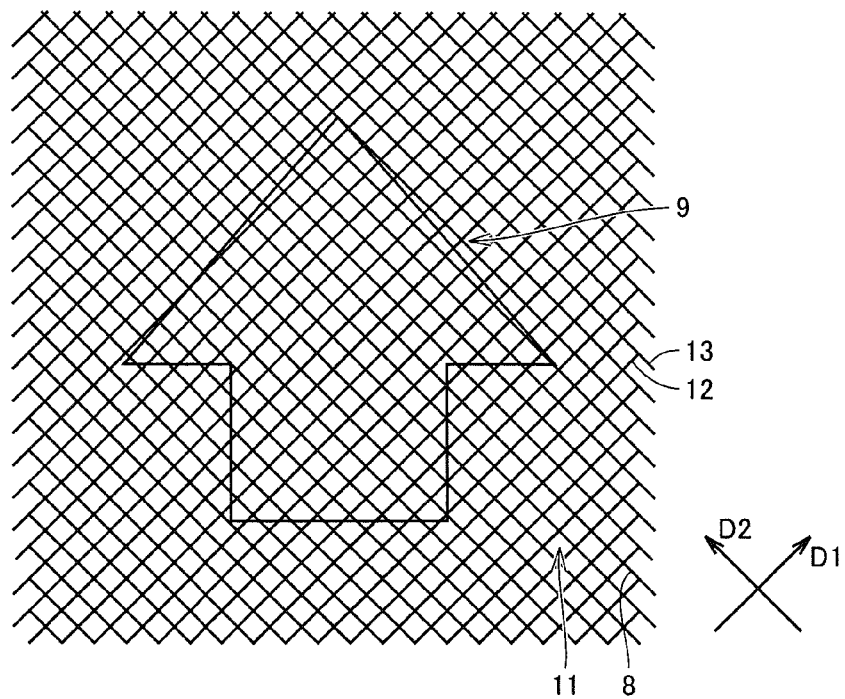
FIG. 13 is a schematic view when an image is displayed in the state shown in FIG. 4.

FIG. 13 is a schematic view when an image is displayed in the state shown in FIG. 4. In this FIG. 13, beam portion 12 and beam portion 13 are shown in an easy-to-understand manner. Actually, beam portion 12 and beam portion 13 have a thickness that cannot be visually recognized. When intersection angle θ formed between imaginary axis line A1 and imaginary axis line A2 is 0° (when imaginary axis line A1 is parallel to imaginary axis line A2) as shown in FIG. 4, mirror surface portion 8 is arranged to rise up vertically with respect to color filter 26 as shown in FIG. 13. Therefore, when image forming substrate 4 is viewed two-dimensionally from directly above image forming substrate 4, reflective surfaces 8a to 8d (side surfaces of beam portions 12 and 13) are not observed.

Therefore, when image 9 displayed on display portion 3 is observed from above image forming substrate 4, with image forming substrate 4 and display portion 3 laminated as shown in FIG. 4, image 9 can be successfully observed as shown in FIG. 13.

Figure 14:
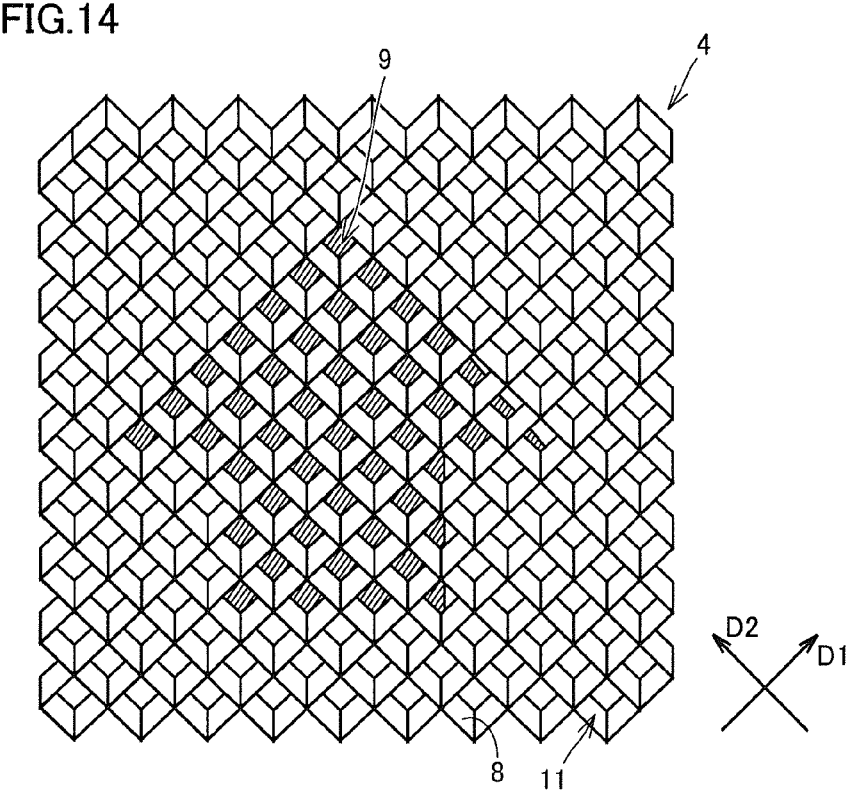
FIG. 14 is a schematic view showing a manner when image 9 is viewed from a viewpoint 32 shown in FIG. 2 in a sight line direction 33.

FIG. 14 is a schematic view showing a manner when image 9 is viewed from a viewpoint 32 shown in FIG. 2 in a sight line direction 33. Sight line direction 33 shown in FIG. 2 is a direction vertical to screen 2 and viewpoint 32 is located on an extension of imaginary axis line A1 passing through image 9. On the other hand, mirror surface portion 8 extends in the direction of imaginary axis line A2, and the direction in which sight line direction 33 extends and the direction in which imaginary axis line A2 extends intersect with each other.

Therefore, as shown in FIG. 14, the observer observes image 9 through inclined holes 11 of mirror surface portions 8. Consequently, as is also clear from FIG. 14, it can be seen that when the observer observes image 9, mirror surface portions 8 cover a part of image 9 and the observer cannot look at image 9 successfully.

Figure 15:
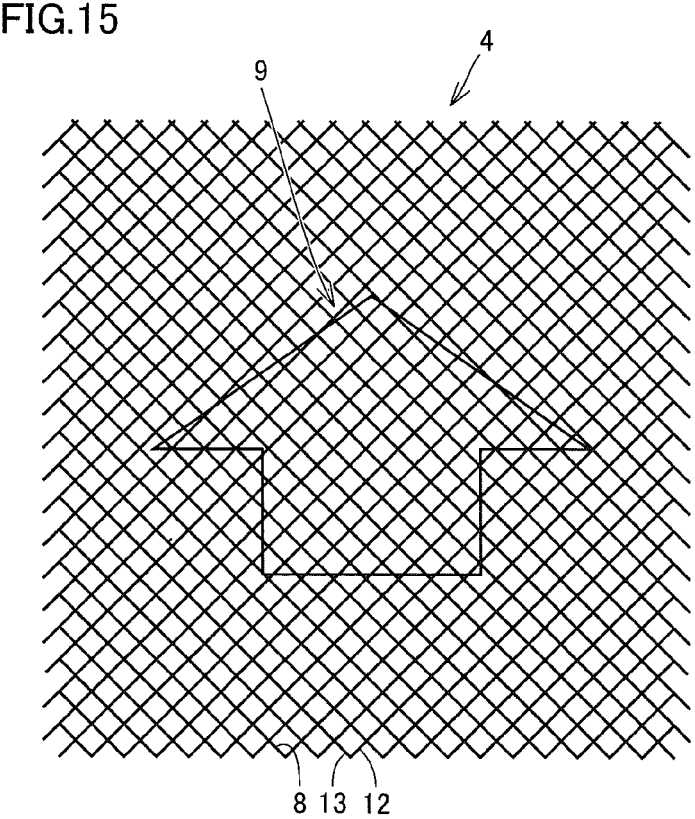
FIG. 15 is a schematic view showing a manner when image 9 is observed from a viewpoint 34 in a sight line direction 35.

The time when image 9 is observed from a viewpoint 34 in a sight line direction 35 in FIG. 2 will be further described. FIG. 15 is a schematic view showing a manner when image 9 is observed from viewpoint 34 in sight line direction 35. In this FIG. 15 and FIG. 2, sight line direction 35 is parallel to the thickness direction of image forming substrate 4, and thus, image 9 is not covered with the reflective surfaces of mirror surface portions 8. On the other hand, display portion 3 that displays image 9 is inclined, and thus, the observer observes image 9 from an oblique direction. Consequently, as shown in FIG. 15, the observer cannot observe image 9 accurately.

On the other hand, when display portion 3 is rotated such that intersection angle θ formed between imaginary axis line A1 and imaginary axis line A2 decreases, screen 2 moves along main surface 6 of image forming substrate 4. Consequently, when image 9 is observed from viewpoint 34, inclined image 9 starts to rise and successful observation of image 9 becomes possible.

When the intersection angle formed between imaginary axis line A1 and imaginary axis line A2 reaches 0°, the observer can observe image 9 successfully as shown in FIG. 13 above.

In FIG. 2, a liquid crystal display device having a front white brightness of about 1000 cd/cm² is used as a liquid crystal display device for display portion 3, and aerial image 10 is observed from a viewpoint 18 in a sight line direction 19 when intersection angle θ is 60°. Then, the brightness of aerial image 10 is about 200 cd/cm², and aerial image 10 can be successfully observed. Furthermore, when image 9 is viewed two-dimensionally from above image forming substrate 4 in the state shown in FIG. 4, the brightness of image 9 is about 800 cd/cm², and image 9 can be successfully observed.

Second Embodiment

Display device 1 according to a second embodiment will be described with reference to FIGS. 16 to 19. The same reference characters are given to the components shown in FIGS. 16 to 19 that are the same as or corresponding to those shown in FIGS. 1 to 15 above, and description thereof will not be repeated.

Figure 16:
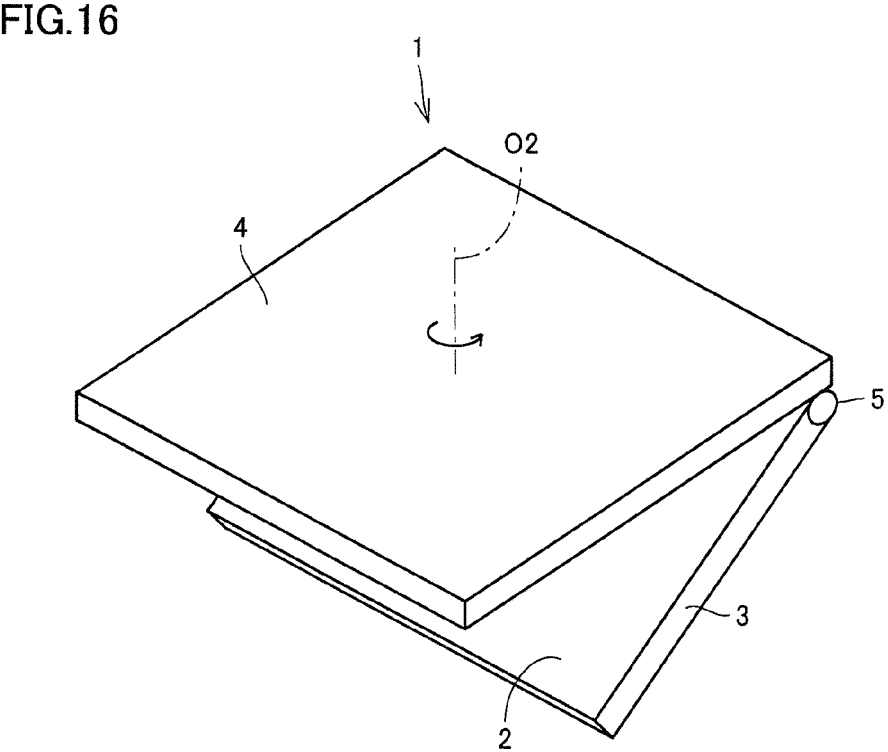
FIG. 16 is a perspective view schematically showing display device 1 according to a second embodiment.

FIG. 16 is a perspective view schematically showing display device 1 according to the second embodiment. As shown in this FIG. 16, image forming substrate 4 is provided to be rotatable about a rotation center line O2 extending vertically with respect to image forming substrate 4 and passing through a center of image forming substrate 4. In the state shown in this FIG. 16, display portion 3 has been rotated about hinge portion 5 and display portion 3 is apart from image forming substrate 4. Therefore, an image displayed on screen 2 forms an image at a position above image forming substrate 4.

Figure 17:
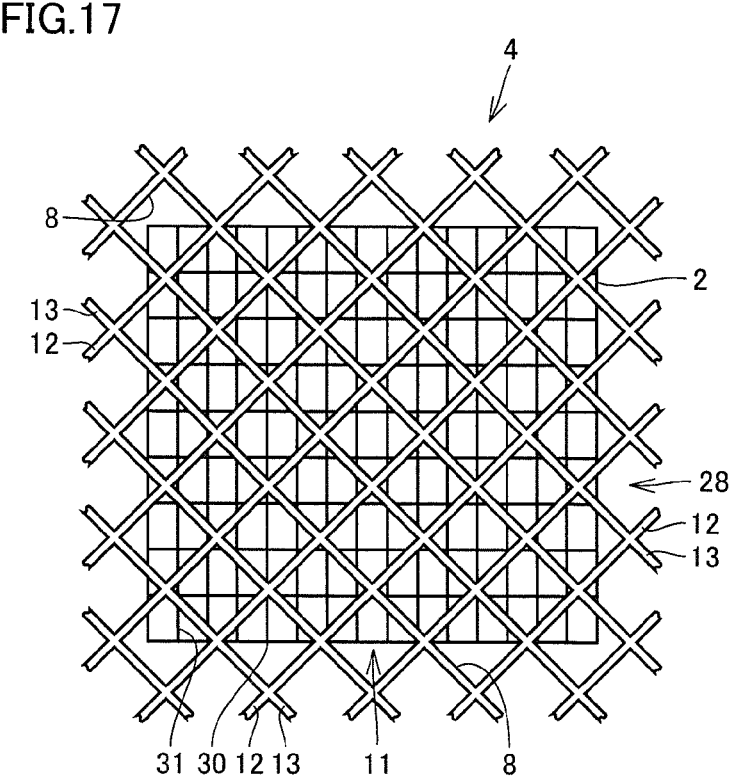
FIG. 17 is a schematic view schematically showing image forming substrate 4 and screen 2 when image forming substrate 4 and screen 2 are viewed from above image forming substrate 4 in the state shown in FIG. 16.

FIG. 17 is a schematic view schematically showing image forming substrate 4 and screen 2 when image forming substrate 4 and screen 2 are viewed from above image forming substrate 4 in the state shown in FIG. 16.

As shown in this FIG. 17, when an aerial image is displayed, beam portion 12 of image forming substrate 4 and beam portion 31 of black matrix 28 intersect with each other at substantially 45°. Similarly, beam portion 13 of image forming substrate 4 and beam portion 30 of black matrix 28 intersect with each other at substantially approximately 45°.

Figure 18:
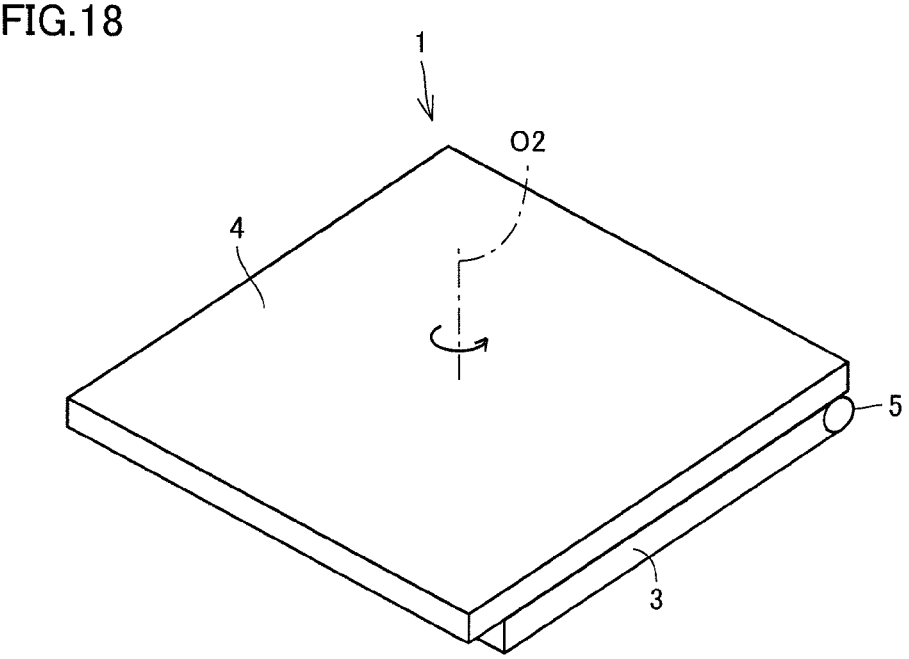
FIG. 18 is a perspective view showing a state where display portion 3 has been rotated from the state shown in FIG. 16 such that display portion 3 and image forming substrate 4 are laminated.

FIG. 18 is a perspective view showing a state where display portion 3 has been rotated from the state shown in FIG. 16 such that display portion 3 and image forming substrate 4 are laminated. When the observer observes an image displayed on display portion 3 from above image forming substrate 4 in the state shown in this FIG. 18, image forming substrate 4 is rotated about rotation center line O2.

Figure 19:
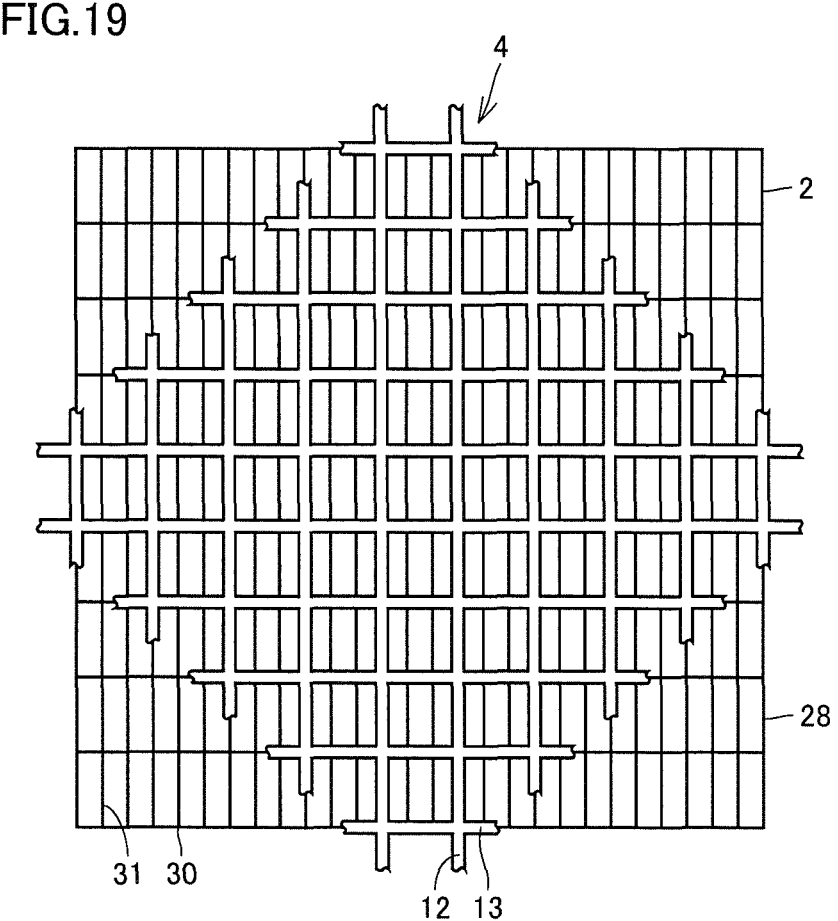
FIG. 19 is a schematic view showing a state where image forming substrate 4 has been rotated, with display portion 3 and image forming substrate 4 laminated as shown in FIG. 18 above.

FIG. 19 is a schematic view showing a state where image forming substrate 4 has been rotated, with display portion 3 and image forming substrate 4 laminated as shown in FIG. 18 above. It is to be noted that this FIG. 19 is also a schematic view when image forming substrate 4 and display portion 3 are viewed from above image forming substrate 4.

As shown in FIG. 19, by rotating image forming substrate 4, beam portion 12 of image forming substrate 4 is arranged to overlap with beam portion 31 of black matrix 28 in the stacking direction of display portion 3 and image forming substrate 4 and to extend along beam portion 31. Similarly, beam portion 13 of image forming substrate 4 overlaps with beam portion 30 of black matrix 28 in the stacking direction, and beam portion 13 extends along beam portion 31. As a result, when the image is viewed from above image forming substrate 4, with display portion 3 and image forming substrate 4 laminated, the image can be looked at successfully.

Third Embodiment

Display device 1 according to a third embodiment will be described with reference to FIGS. 20 and 21. The same reference characters are given to the components shown in FIGS. 20 and 21 that are the same as or corresponding to those shown in FIGS. 1 to 19 above, and description thereof will not be repeated.

Figure 20:
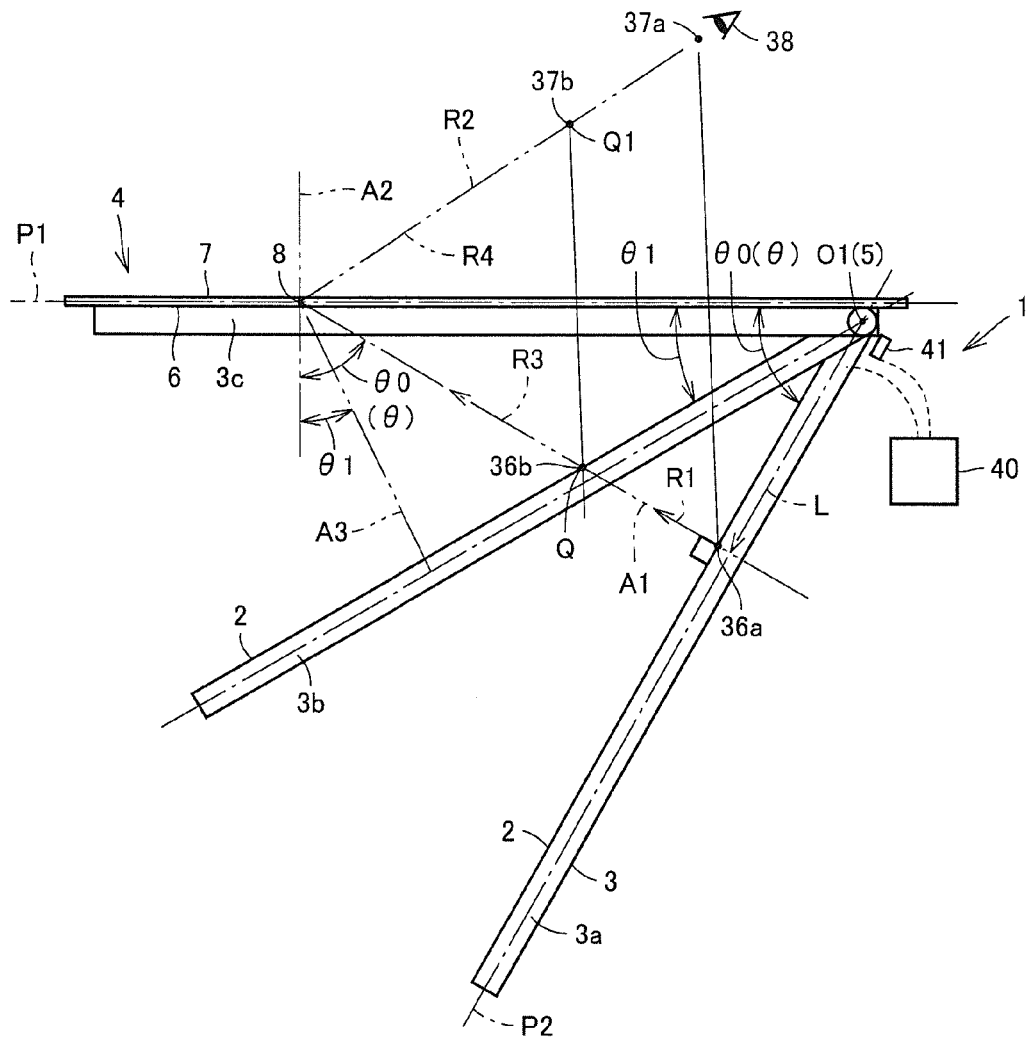
FIG. 20 is a side view showing image forming positions when intersection angle θ is sequentially changed in display device 1 according to a third embodiment.

FIG. 20 is a side view showing image forming positions when intersection angle θ is sequentially changed in display device 1 according to the third embodiment.

In the example shown in FIG. 20, image forming substrate 4 includes main surface 7 and main surface 6 formed into parallel plates. Therefore, imaginary plane P1 passes through a position that is intermediate between main surface 7 and main surface 6. Display portion 3 is also formed into a plate and an imaginary plane P2 passing through a central portion of display portion 3 in the thickness direction is parallel to screen 2. By hinge portion 5, display portion 3 is provided to be rotatable about rotation center line O1. Imaginary plane P2 is provided to pass through rotation center line O1. A display portion 3a corresponds to display portion 3 when intersection angle θ is set at, for example, intersection angle θ0, and a display portion 3b corresponds to display portion 3 when intersection angle θ is set at, for example, intersection angle θ1 (<θ0). A display portion 3c corresponds to display portion 3 when intersection angle θ is 0°.

Display device 1 includes a control unit 40 controlling a position of an image displayed on screen 2, and an angle sensor 41 measuring an intersection angle formed between main surface 6 and screen 2. Angle sensor 41 transmits an angle signal corresponding to the sensed intersection angle to control unit 40. Based on the sensed intersection angle, control unit 40 adjusts the brightness and the like of the displayed image, and the function of control unit 40 will be described below.

Since main surface 7 is parallel to main surface 6, imaginary axis line A2 extending in the thickness direction of image forming substrate 4 and main surface 6 intersect with each other vertically. Furthermore, imaginary axis line A1 is an imaginary axis line vertical to screen 2, and thus, an intersection angle formed between main surface 6 of image forming substrate 4 and screen 2 of display portion 3 corresponds to intersection angle θ formed between imaginary axis line A1 and imaginary axis line A2.

In display portion 3a, an image 36a is displayed on screen 2. An aerial image 37a for image 36a is formed at a position that is symmetric with respect to imaginary plane P1 (image forming substrate 4) serving as a reference plane.

Light R1 emitted in the direction vertical to screen 2, of light from image 36a, is reflected as reflected light R2 by mirror surface portion 8 of image forming substrate 4. Thereafter, reflected light R2 passes through the image forming position and reaches the observer's eyes.

Description will be given to the time when display portion 3 is rotated about rotation center line O1 from the state of display portion 3a and the intersection angle formed between imaginary axis line A1 and imaginary axis line A2 reaches intersection angle θ1.

Display portion 3b in the figure corresponds to a display portion when the intersection angle is set at intersection angle θ1. Assuming that an imaginary axis line A3 represents an imaginary axis line vertical to screen 2 of display portion 3b, an intersection angle formed between imaginary axis line A3 and imaginary axis line A2 corresponds to intersection angle θ1.

Assume that an intersection point Q represents an intersection point of screen 2 of this display portion 3b and aforementioned light R1. Assuming that "L" represents a distance between rotation center line O1 and image 36a, and "X" represents a distance between intersection point Q and rotation center line O1, "X" satisfies an equation (1) below:

$$X = L/\cos(\theta 0 - \theta 1) \quad (1)$$

Therefore, "X" is larger than "L" and the distance between intersection point Q and rotation center line O1 is larger than the distance between image 36a and rotation center line O1.

Control unit 40 causes image 36a displayed in display portion 3a to be displayed on intersection point Q. In other words, control unit 40 moves the displayed image such that a distance from rotation center line O1 increases as intersection angle θ becomes smaller than intersection angle θ0.

Light from an image 36b displayed on intersection point Q forms an image at an image forming point Q1 and image 36b is displayed as an aerial image 37b.

Light R3, of light emitted from image 36b, follows the same route as that of aforementioned light R1. Light R3 is then reflected as reflected light R4 by mirror surface portion 8. Reflected light R4 follows the same route as that of reflected light R2. Then, reflected light R4 goes through image forming point Q1 and is perceived by the observer's eyes.

Therefore, the observer can look at aerial image 37b without changing the viewpoint and the observation direction from the state where the observer is observing aerial image 37a. Even if display portion 3 is rotated, the observer can look at the aerial image from the same viewpoint.

Figure 21:
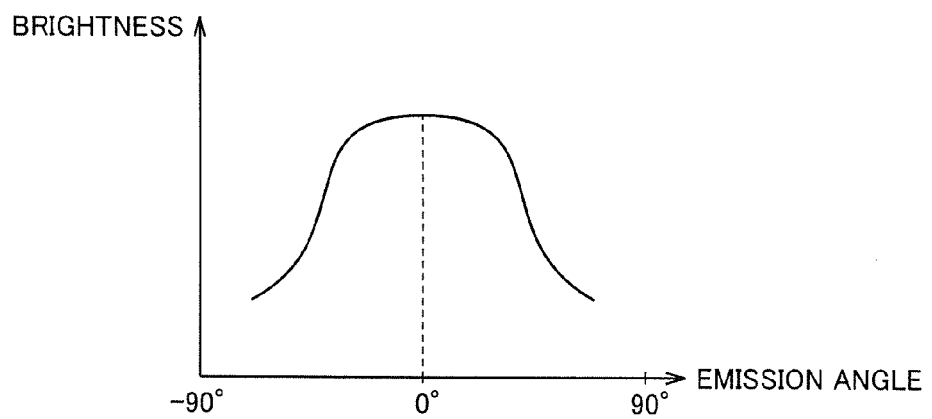
FIG. 21 is a graph schematically showing a relationship between light emission angle and brightness in one pixel.

FIG. 21 is a graph schematically showing a relationship between light emission angle and brightness in one pixel. In the graph shown in this FIG. 21, the horizontal axis indicates an emission angle (°) of emitted light with respect to an optical axis, and the vertical axis indicates a brightness of the light. The optical axis extends in the direction vertical to screen 2.

As shown in this FIG. 21, light emitted at an emission angle of 0° has the highest brightness, and as the emission angle increases, the brightness decreases. In FIG. 20, light R1 travels in the direction vertical to screen 2 and has the highest brightness among the light emitted from image 36a.

It can be seen that light emitted in the direction vertical to screen 2 of display portion 3b, of the light emitted from image 36b, has the highest brightness and the brightness of light R3 is lower than that of this light.

Control unit 40 enhances the brightness of the pixel that displays the image, as intersection angle θ becomes smaller than intersection angle θ0. As a result, even when intersection angle θ is small, the brightness of the light perceived by the observer's eyes is kept constant and the brightness of the displayed aerial image can also be kept constant.

Figure 22:
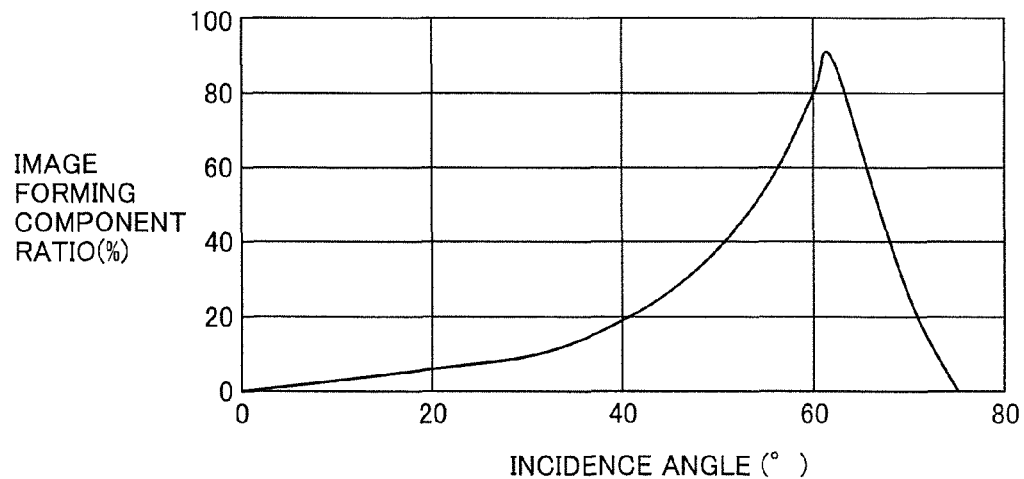
FIG. 22 is a graph showing a relationship between image forming component ratio of image forming substrate 4 and light incidence angle.

FIG. 22 is a graph showing a relationship between image forming component ratio of image forming substrate 4 and light incidence angle. In the graph shown in this FIG. 22, the horizontal axis indicates an incidence angle when light from the display portion enters main surface 6. The vertical axis indicates an image forming component ratio. "Image forming component ratio" refers to a ratio of light contributing to image formation, to light from an object to be projected (e.g., display panel). As the image forming component ratio approaches 100%, the light from the object to be projected forms an image more efficiently by a reflective image forming element and the visibility of the aerial image becomes higher.

As is also clear from FIG. 20, the incidence angle when the light from the display portion enters main surface 6 is equal to intersection angle θ. As shown in FIG. 22, it can be seen that the image forming component ratio is high when the incidence angle (intersection angle θ) is 55° or larger and 67° or smaller.

When display device 1 displays the aerial image, intersection angle θ is preferably set at 55° or larger and 67° or smaller. When display device 1 displays the aerial image, intersection angle θ is particularly preferably set at 60°. Specifically, in FIG. 20, intersection angle θ0 is set at 60°.

Since intersection angle θ0 is set at 60°, the incidence angle of light R1 having the highest brightness, of the light emitted from image 36a, is set at 60°. Therefore, the light having the highest brightness is efficiently reflected, and thus, the visibility of aerial image 37b can be further enhanced.

In the third embodiment, the case where the viewpoint of the observer is fixed at a certain position has been described. As a matter of course, the viewpoint of the observer may vary in accordance with a change in intersection angle θ.

Fourth Embodiment

When an aerial image that is being viewed by the observer becomes dark, the observer often changes a position of the viewpoint and searches for a position where the observer can view the bright aerial image. In display device 1 according to this fourth embodiment, the brightness of a displayed aerial image can be maintained high even when intersection angle θ fluctuates.

Figure 23:
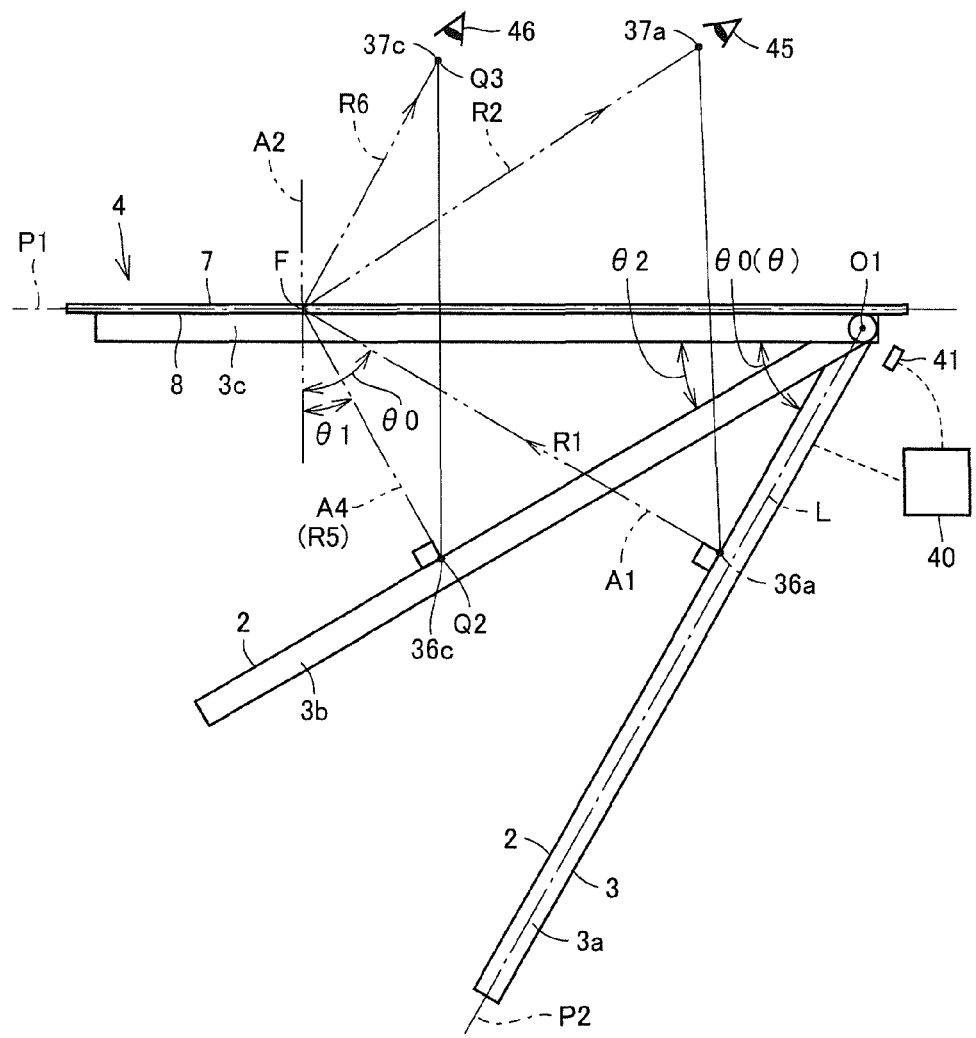
FIG. 23 is a side view describing display device 1 according to a fourth embodiment.

Display device 1 according to the fourth embodiment of the present invention will be described with reference to FIG. 23 and FIG. 22 above. The same reference characters are given to the components shown in FIG. 23 that are the same as or corresponding to those shown in FIGS. 1 to 22 above, and description thereof will not be repeated. In this FIG. 23, display portion 3a is arranged at a position where intersection angle θ is 60°.

Image 36a is displayed on screen 2 of this display portion 3a. Light from this image 36a forms an image by image forming substrate 4 and aerial image 37a is displayed.

Light R1 traveling along imaginary axis line A1, of the light emitted from image 36a, has a high brightness. This light R1 is reflected as reflected light R2 by image forming substrate 4 and passes through a focal point where aerial image 37a is located. The observer perceives reflected light R2 and observes aerial image 37a at viewpoint 45. The observer recognizes aerial image 37a by perceiving light R1, and the brightness of aerial image 37a is high.

Imaginary axis line A1 is an imaginary axis line that passes through image 36a and is vertical to screen 2. Assume that a reference intersection point F represents an intersection point of this imaginary axis line A1 and image forming substrate 4.

Display portion 3b corresponds to a display portion when display portion 3a is rotated about rotation center line O1 and intersection angle θ becomes smaller than 60°.

Assume that an imaginary axis line A4 represents an imaginary axis line passing through reference intersection point F and vertically intersecting with screen 2 of display portion 3b. Assume that an intersection point Q2 represents an intersection point of this imaginary axis line A4 and screen 2 of display portion 3b.

Control unit 40 moves the image displayed on screen 2 of display portion 3b to intersection point Q2. An image 36c displayed on intersection point Q2 forms an image at an image forming point Q3 by image forming substrate 4. At image forming point Q3, an aerial image 37c is displayed.

Light R5 traveling along imaginary axis line A4, of light emitted from image 36c, has the highest brightness. This light R5 is reflected as reflected light R6 by mirror surface portion 8 located at reference intersection point F. Reflected light R6 travels from reference intersection point F through image forming point Q3.

At viewpoint 45, light from aerial image 37c cannot be looked at or light from aerial image 37c cannot be perceived successfully.

Therefore, the observer shifts the viewpoint to a position where the observer can clearly look at aerial image 37c. When the observer views reference intersection point F from a viewpoint 46, the observer can perceive reflected light R6.

As described above, the brightness of reflected light R6 is high, and thus, the observer can clearly perceive aerial image 37c.

When aerial image 37a is displayed, reflected light R2 having the highest brightness passes through reference intersection point F. When aerial image 37c is displayed, reflected light R6 having the highest brightness also passes through reference intersection point F.

Even when display portion 3 is moved, the observer can again perceive the bright aerial image by changing a position of the viewpoint while viewing reference intersection point F. As described above, even when the brightness of the aerial image that is being viewed by the observer becomes lower as a result of rotation of display portion 3, the observer can easily find out the bright aerial image.

In FIG. 22, it can be seen that when the incidence angle becomes smaller than 60°, the image forming component ratio of image forming substrate 4 decreases as the incidence angle decreases.

As described above, the incidence angle in FIG. 22 corresponds to the incidence angle when the light from screen 2 enters mirror surface portion 8, and this incidence angle is substantially the same as intersection angle θ.

When intersection angle θ becomes smaller than 60°, control unit 40 enhances the brightness of the displayed image as intersection angle θ decreases. As a result, decrease in the brightness of the displayed aerial image caused by rotational movement of display portion 3 can be suppressed.

Figure 24:
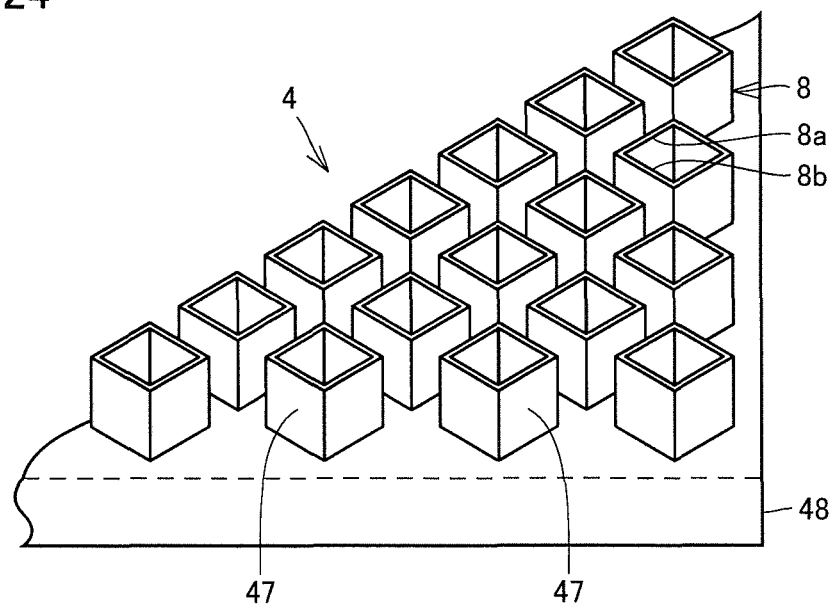
FIG. 24 is a perspective view showing a modification of image forming substrate 4.

Although the first to third embodiments have been described using one example of image forming substrate 4, image forming substrate 4 shown in FIG. 24 can also be used.

In the example shown in FIG. 24, image forming substrate 4 includes a substrate 48 formed into a flat plate, a plurality of tube portions 47 arranged in an array on a main surface of this substrate 48, and mirror surface portion 8 formed on an inner circumferential surface of this tube portion 47. Tube portions 47 extend in the thickness direction of substrate 48. The inner circumferential surface of tube portion 47 is formed of four inner planes and the adjacent inner planes are arranged to be orthogonal to each other. Each inner plane is provided with the mirror surface portion.

Fifth Embodiment

Figure 25:
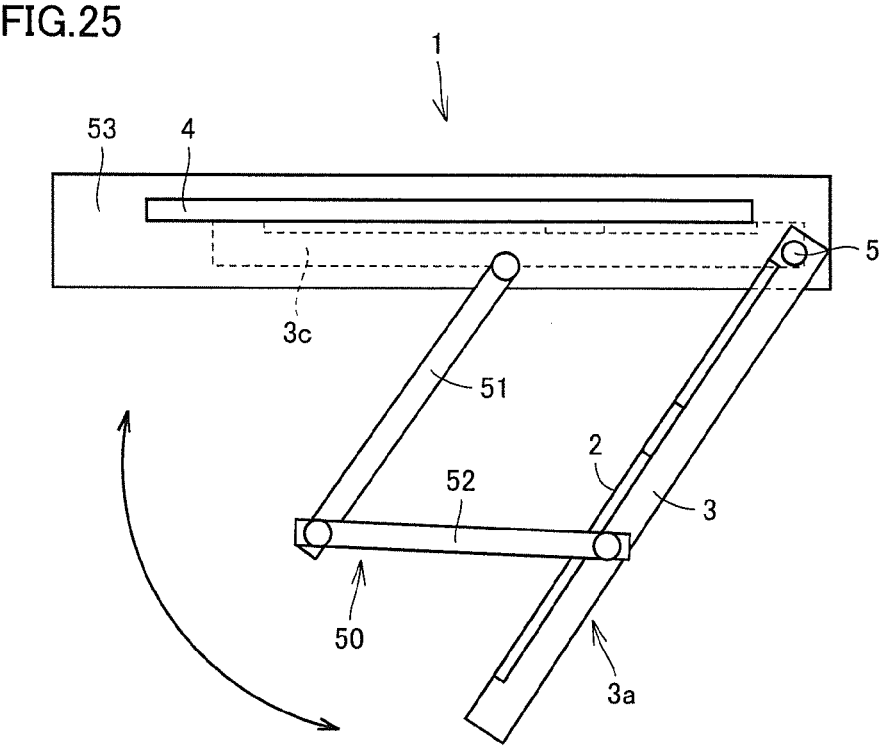
FIG. 25 is a side view schematically showing a first modification of display device 1.

Various modifications of display device 1 will be described with reference to FIGS. 25 to 36. The same reference characters are given to the components shown in these FIGS. 25 to 36 that are the same as or corresponding to those shown in FIGS. 1 to 24 above, and description thereof will not be repeated. FIG. 25 is a side view schematically showing a first modification of display device 1.

Display device 1 shown in this FIG. 25 includes image forming substrate 4, a frame 53 supporting image forming substrate 4, a link mechanism 50 linking display portion 3 and frame 53, and hinge portion 5.

Link mechanism 50 includes a support bar 51 and a support bar 52. One end of support bar 51 is rotatably supported by frame 53 and one end of support bar 52 is rotatably supported by display portion 3. The other end of support bar 51 and the other end of support bar 52 are rotatably linked.

Figure 26:
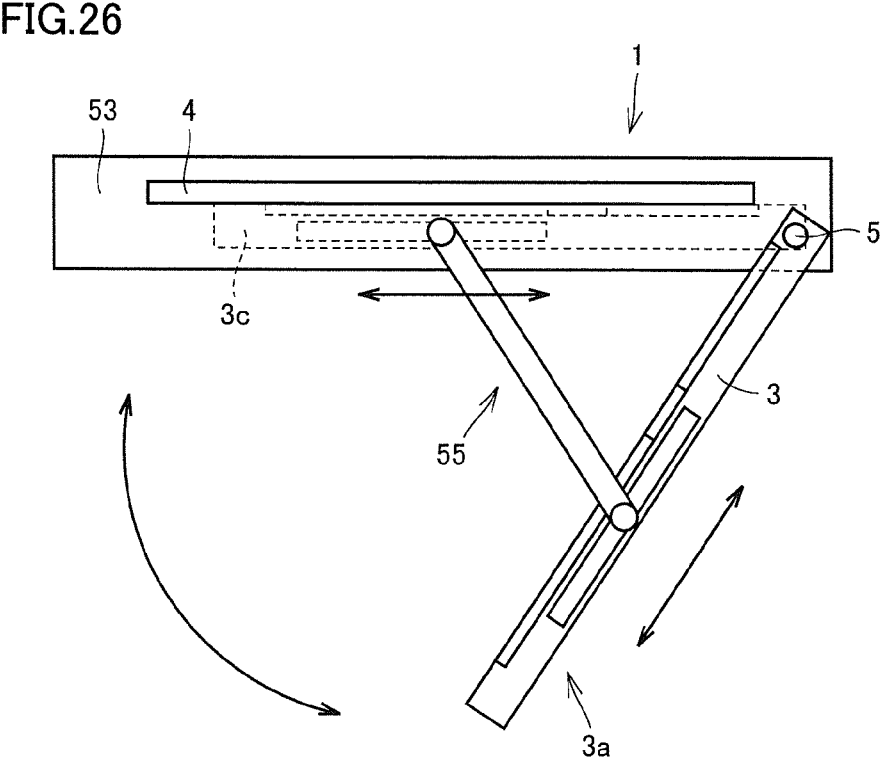
FIG. 26 is a side view schematically showing a second modification of display device 1.

FIG. 26 is a side view schematically showing a second modification of display device 1. In the example shown in this FIG. 26, display portion 3 is supported by a slider mechanism 55.

Figure 27:
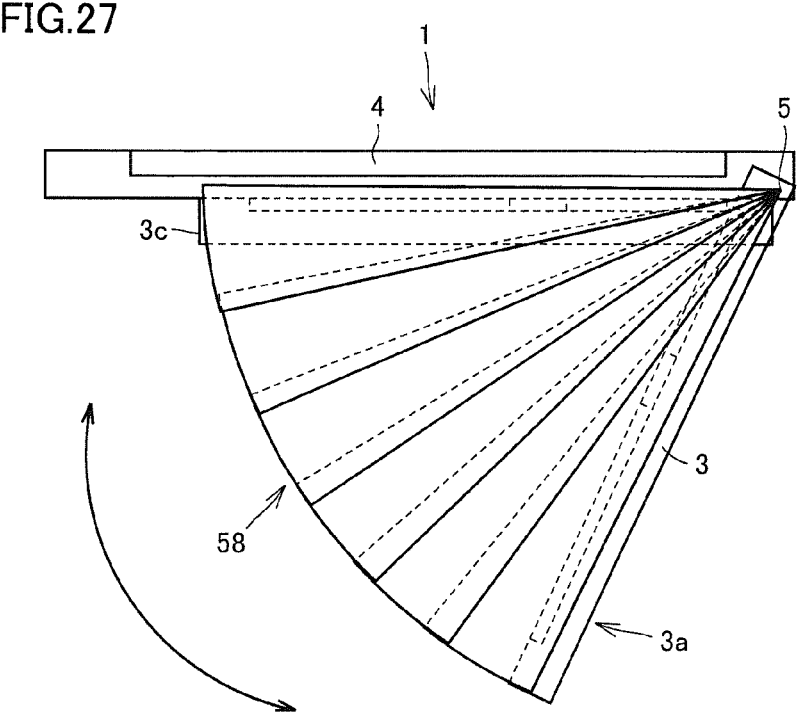
FIG. 27 is a side view showing a third modification of display device 1.

FIG. 27 is a side view showing a third modification of display device 1. In the example shown in this FIG. 27, display portion 3 and image forming substrate 4 are linked by a bellows mechanism 58. This bellows mechanism 58 includes a plurality of sector-shaped light blocking plates and the adjacent light blocking plates are linked to be slidable with respect to each other. Bellows mechanism 58 is rotatably provided at hinge portion 5.

Therefore, when display device 1 displays an aerial image, entry of external light into image forming substrate 4 can be suppressed or attachment of foreign substances to the screen of display portion 3 can be suppressed.

Figure 28:
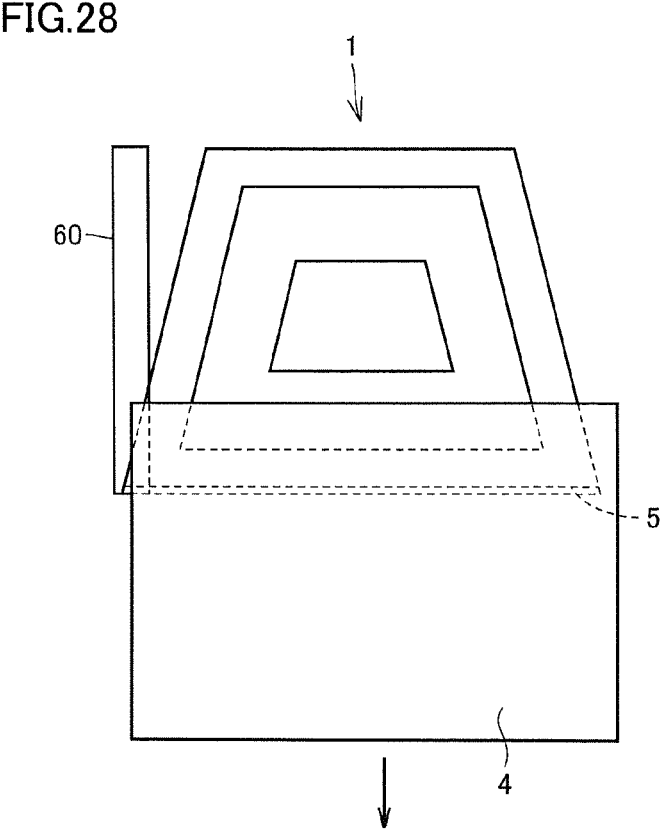
FIG. 28 is a plan view showing a fourth modification of display device 1.

FIG. 28 is a plan view showing a fourth modification of display device 1. In the example shown in this FIG. 28, display device 1 includes display portion 3, image forming substrate 4, hinge portion 5 supporting display portion 3 and image forming substrate 4 such that at least one can rotate with respect to the other, and a guide member 60 guiding image forming substrate 4. By guide member 60, image forming substrate 4 can be retracted from above display portion 3. Therefore, when the observer views a two-dimensional image, image forming substrate 4 is retracted from above display portion 3, and thereby, the observer can directly observe the two-dimensional image displayed on display portion 3.

In the example shown in FIG. 28, image forming substrate 4 is provided to be slidable in the direction orthogonal to the direction in which hinge portion 5 extends. However, the direction in which image forming substrate 4 can move is not limited to this direction.

Figure 29:
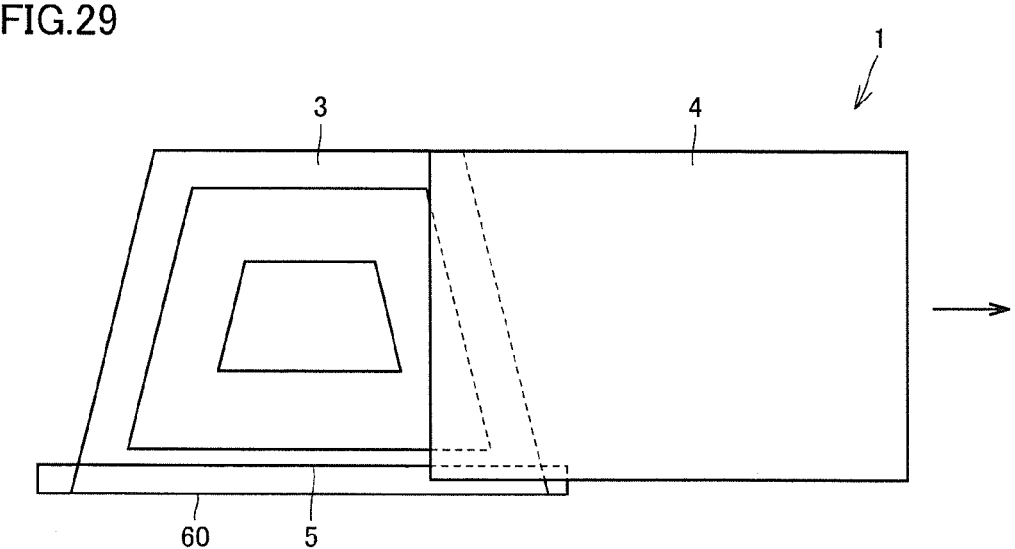
FIG. 29 is a plan view showing a modification of display device 1 shown in FIG. 28.

For example, as shown in FIG. 29, image forming substrate 4 may be slidable in the direction parallel to the direction in which hinge portion 5 extends.

Figure 30:
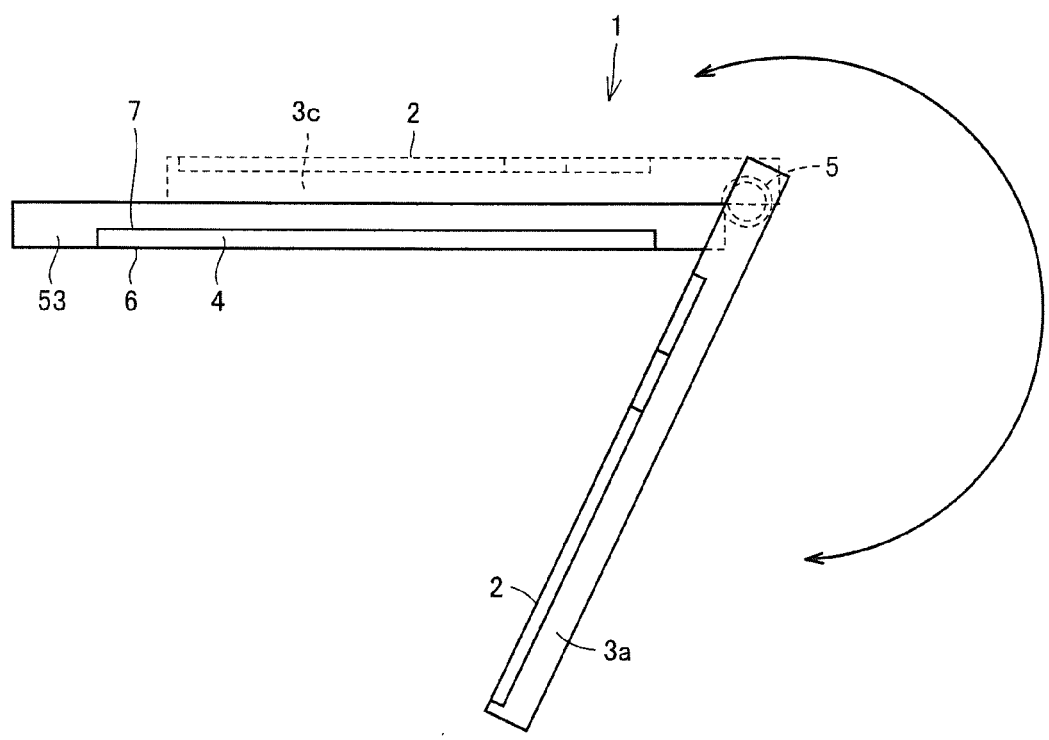
FIG. 30 is a side view schematically showing a fifth modification of display device 1.

FIG. 30 is a side view schematically showing a fifth modification of display device 1. In the example shown in this FIG. 30, display portion 3 is rotatably provided by hinge portion 5, and display portion 3 is supported to be rotatable from the state shown by display portion 3a in the figure to the state shown by display portion 3c in the figure.

Display portion 3a is located below main surface 6 of image forming substrate 4, and light from screen 2 of display portion 3a enters image forming substrate 4 from main surface 6. This light is reflected by image forming substrate 4 and forms an image at a position above main surface 7.

Display portion 3c is located on main surface 7 of image forming substrate 4. Screen 2 is directed upward and the observer can directly observe screen 2.

Figure 31:
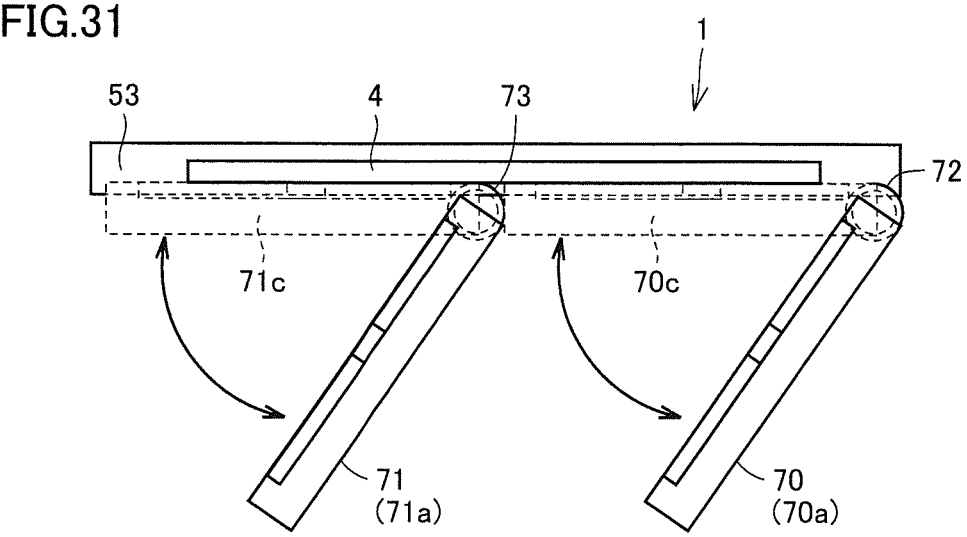
FIG. 31 is a side view schematically showing a sixth modification of display device 1.

FIG. 31 is a side view schematically showing a sixth modification of display device 1. In the example shown in this FIG. 31, display portion 3 includes a plurality of split display portions 70 and 71. Split display portion 70 is rotatably provided by a hinge portion 72, and split display portion 71 is rotatably provided by a hinge portion 73.

Split display portion 70 is provided to be rotatable from the state shown by a split display portion 70a in the figure to the state shown by a split display portion 70c in the figure. Split display portion 70a is arranged such that a screen thereof is inclined with respect to main surface 6 of image forming substrate 4. Split display portion 70c is located below main surface 6, and split display portion 70c and image forming substrate 4 are located along each other.

Split display portion 71 is also provided to be rotatable from the state shown by a split display portion 71a in the figure to the state shown by a split display portion 71c in the figure.

Split display portion 71a is located below main surface 6, and is arranged such that a screen of split display portion 71a is inclined with respect to main surface 6. Split display portion 71c is located below main surface 6, and split display portion 71c and image forming substrate 4 are arranged along each other.

According to the example shown in this FIG. 31, display device 1 can be made compact.

Figure 32:
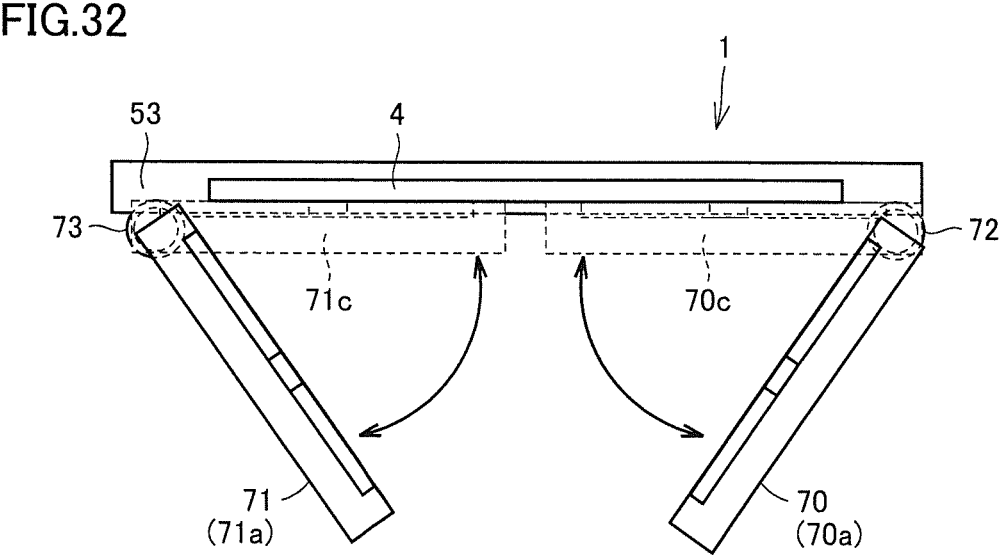
FIG. 32 is a side view showing a modification of display device 1 shown in FIG. 31.

FIG. 32 is a side view showing a modification of display device 1 shown in FIG. 31. In this FIG. 32, the direction in which split display portion 70 rotates from the state shown by split display portion 70a in the figure (first state) to the state shown by split display portion 70c in the figure (second state) is opposite to the direction in which split display portion 71 rotates from the state shown by split display portion 71a in the figure (first state) to the state shown by split display portion 71c in the figure (second state). As described above, the rotation directions of the respective split display portions may be different from each other.

Figure 33:
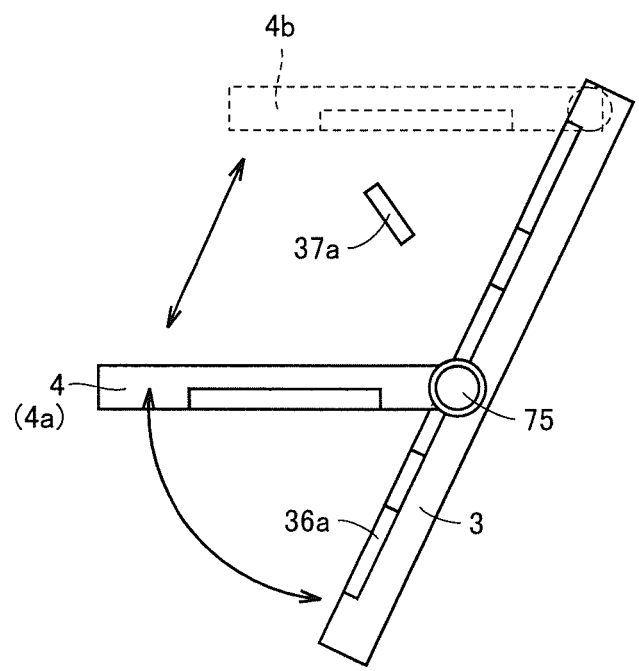
FIG. 33 is a schematic view showing a seventh modification of display device 1.

FIG. 33 is a schematic view showing a seventh modification of display device 1. In the example shown in FIG. 33, image forming substrate 4 is provided to be slidable with respect to display portion 3, with image forming substrate 4 inclined with respect to the screen of display portion 3. As a result, an image displayed on the screen of display portion 3 can be selected and displayed as an aerial image. Furthermore, in the example shown in this FIG. 33, image forming substrate 4 is rotatably provided and image forming substrate 4 can be arranged on display portion 3. At this time, image forming substrate 4 and display portion 3 are aligned in the thickness direction of image forming substrate 4 and are arranged along each other.

Figure 34:
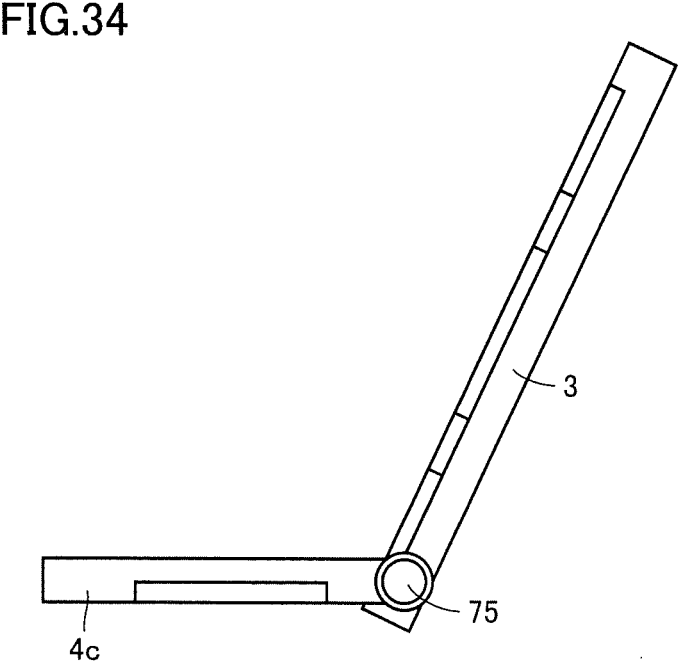
FIG. 34 is a schematic view showing a modification of display device 1 shown in FIG. 33.
Figure 35:
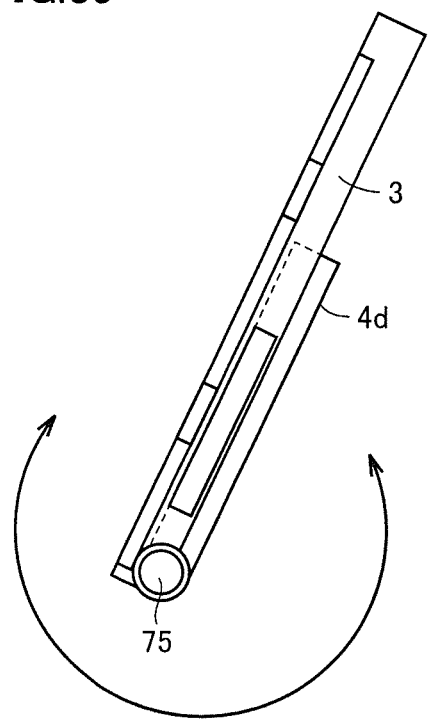
FIG. 35 is a schematic view showing a modification of display device 1 shown in FIG. 33.

FIGS. 34 and 35 are schematic views showing modifications of display device 1 shown in FIG. 33. As shown by an image forming substrate 4c in FIG. 34, image forming substrate 4 is provided to be slidable to an end of display portion 3. Furthermore, as shown by an image forming substrate 4d in FIG. 35, image forming substrate 4 is provided to be rotatable at the end of display portion 3 and movable to the rear surface side of display portion 3.

According to the examples shown in these FIGS. 34 and 35, the observer can directly look at an image displayed on the screen of display portion 3.

Figure 36:
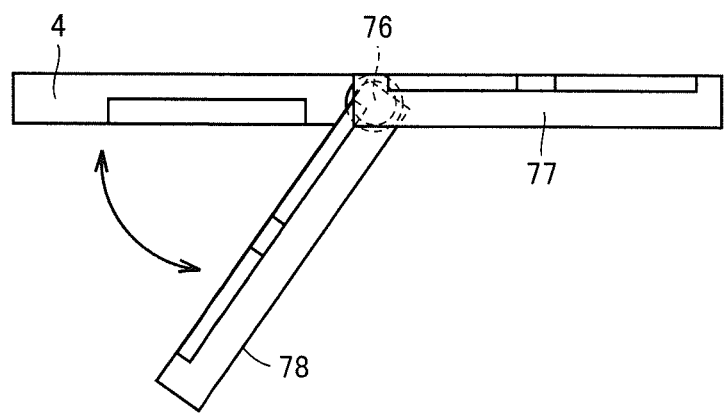
FIG. 36 is a side view schematically showing an eighth modification of display device 1.

FIG. 36 is a side view schematically showing an eighth modification of display device 1. As shown in this FIG. 36, display portion 3 includes a fixed display portion 77 and a movable display portion 78. As a result, an image on fixed display portion 77 can be perceived as a two-dimensional image and an image on movable display portion 78 can be perceived as an aerial image. Movable display portion 78 is provided to be rotatable from the state where movable display portion 78 is inclined with respect to image forming substrate 4 to the state where movable display portion 78 is located on a lower surface of image forming substrate 4 and along image forming substrate 4.

Although the embodiments of the present invention have been described above, it should be understood that the embodiments disclosed herein are illustrative and not limitative in any respect. The scope of the present invention is defined by the terms of the claims, and is intended to include any modifications within the scope and meaning equivalent to the terms of the claims. Furthermore, the above numerical values or the like are merely provided for illustrative purposes, and the present invention is not limited to the aforementioned numerical values and ranges.

INDUSTRIAL APPLICABILITY

The present invention is applicable to a display device and is particularly suitable for a display device that can display an aerial image.

REFERENCE SIGNS LIST 3 display portion; 4 image forming substrate; 5 hinge portion; 6, 7 main surface; 8a, 8b, 8c, 8d reflective surface; 8 mirror surface portion; 9 image; 10 aerial image; 12, 13 beam portion; 14 frame portion; 20 backlight unit; 21 display unit; 22 active matrix substrate; 23 common substrate; 24 liquid crystal layer; 25 glass substrate; 26 color filter; 27 common electrode; 28 black matrix; 29 color layer; 30, 31 beam portion; 40 control unit; 41 angle sensor; 50 link mechanism; 51 support bar; 52 support bar; 53 frame; 55 slider mechanism; 58 bellows mechanism; 60 guide member; 70, 71 split display portion; 72 hinge portion; 73 hinge portion; 77 fixed display portion; 78 movable display portion

The invention claimed is:

1. A display device, comprising:
a display portion including a screen configured to display an image;
an image forming substrate formed into a plate, wherein said image forming substrate includes a first main surface and a second main surface aligned in a thickness direction, and a plurality of mirror surface portions configured to reflect, toward said second main surface side, light that has been emitted from said display portion and has entered said image forming substrate from said first main surface side and configured to form the image on said second main surface side, and said display portion and said image forming substrate are configured to be switchable between a first state where said screen is arranged to be inclined with respect to said first main surface such that light from said screen enters said image forming substrate from said first main surface side and forms the image on said second main surface side and a second state where said display portion and said image forming substrate are aligned in said thickness direction and are arranged along each other; and a support member configured to support at least one of said display portion and said image forming substrate to be rotatable about a first imaginary axis line such that an angle formed between said screen and said first main surface is variable.

2. The display device according to claim 1, wherein
said image forming substrate is provided with a plurality of holes extending in said thickness direction,
said mirror surface portion is formed on an inner circumferential surface of said hole, and
in said second state, said screen is viewable through said plurality of holes.

3. The display device according to claim 2, wherein
said display portion includes a black matrix having a light blocking effect,
said black matrix includes a plurality of linear portions spaced apart from one another,
said image forming substrate includes a plurality of first beam portions extending in a first direction along said first main surface and spaced apart from one another in a second direction intersecting with said first direction, and a plurality of second beam portions extending in said second direction and spaced apart from one another in said first direction,
said image forming substrate is provided with the plurality of holes surrounded by said plurality of first beam portions and said plurality of second beam portions,
said mirror surface portion is formed on the inner circumferential surface of said hole, and
when said display portion and said image forming substrate are viewed from above said image forming substrate in said second state, at least one of said plurality of first beam portions and said plurality of second beam portions are arranged to overlap with said linear portions and to extend along said linear portions.

4. The display device according to claim 1, further comprising:
a control unit configured to control a display position of said image; and
a sensing unit configured to sense the angle formed between said screen and said first main surface, wherein
said control unit is configured to move said image such that a distance from said first imaginary axis line increases as the angle formed between said screen and said first main surface decreases.

5. The display device according to claim 4, wherein said control unit is configured to move said image to said image display position assuming that:

a first reference screen represents said screen in said first state;
a reference image represents an image displayed on said first reference screen;
a second imaginary axis line represents an imaginary axis line passing through said reference image and said image forming substrate;
a second reference screen represents said screen when said display portion is moved from said first state such that the angle formed between said screen and said first main surface decreases; and
an image display position represents an intersection point of said second reference screen and said second imaginary axis line.

6. The display device according to claim 4, wherein
said control unit is configured to enhance a brightness of said screen as the angle formed between said screen and said first main surface decreases.

7. The display device according to claim 6, wherein said control unit is configured to adjust the brightness of said screen such that light traveling along a second imaginary axis line, of the light emitted from said screen, has a constant brightness, assuming that:
a first reference screen represents said screen in said first state;
a reference image represents an image displayed on said first reference screen; and
the second imaginary axis line represents an imaginary axis line passing through said reference image and said image forming substrate.

8. The display device according to claim 4, wherein said control unit is configured to move said image to an intersection point of a third imaginary axis line and a second reference screen, assuming that:
a first reference screen represents said screen in said first state;
a reference image represents an image displayed on said first reference screen;
a second imaginary axis line represents an imaginary axis line passing through said reference image and vertical to said first reference screen;
a reference intersection point represents an intersection point of said image forming substrate and said second imaginary axis line;
the second reference screen represents said screen when said display portion is moved from said first state such that the angle formed between said screen and said first main surface decreases; and
the third imaginary axis line represents an imaginary axis line passing through said reference intersection point and vertically intersecting with said second reference screen.

9. The display device according to claim 8, wherein
assuming that an incidence angle represents an angle when the light from said display portion enters said first main surface,
an image forming component ratio of said image forming substrate decreases as said incidence angle becomes smaller than a predetermined incidence angle, and
when the angle formed between said screen and said first main surface becomes smaller than said incidence angle, said control unit is configured to enhance a brightness of said image.

10. The display device according to claim 1, wherein
said image forming substrate is provided to be retractable from above said display portion.

11. The display device according to claim 1, wherein
said display portion includes a first display portion and a second display portion, and
at least one of said first display portion and said second display portion is configured to be switchable between said second state and said first state.

12. The display device according to claim 1, wherein
said display portion is located on said second main surface of said image forming substrate in said second state.

* * * * *